US012383876B2

(12) United States Patent
Denison et al.

(10) Patent No.: US 12,383,876 B2
(45) Date of Patent: Aug. 12, 2025

(54) MICROFLUIDIC MIXERS

(71) Applicant: Hewlett-Packard Development Company, L.P., Spring, TX (US)

(72) Inventors: Carson Denison, Corvallis, OR (US); Richard W. Seaver, Corvallis, OR (US); Erik D. Torniainen, Corvallis, OR (US); Pavel Kornilovich, Corvallis, OR (US); Alexander Govyadinov, Corvallis, OR (US); Anand Samuel Jebakumar, Corvallis, OR (US); Oumnia El Fajri, Corvallis, OR (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 670 days.

(21) Appl. No.: 17/826,943

(22) Filed: May 27, 2022

(65) Prior Publication Data

US 2023/0381723 A1 Nov. 30, 2023

(51) Int. Cl.
*B01F 33/3012* (2022.01)
*B01F 35/71* (2022.01)
*B01F 101/00* (2022.01)

(52) U.S. Cl.
CPC ...... *B01F 33/3012* (2022.01); *B01F 35/7172* (2022.01); *B01F 2101/2204* (2022.01)

(58) Field of Classification Search
CPC .............. B01F 33/3012; B01F 35/7172; B01F 2101/2204
See application file for complete search history.

(56) References Cited

U.S. PATENT DOCUMENTS

2007/0048192 A1* 3/2007 Kartalov ............... F16K 99/003 422/400
2008/0085551 A1* 4/2008 Kim ........................ B01F 33/30 438/1

OTHER PUBLICATIONS

He et al, "Overpass" at the junction of a crossed microchannel: An enabler for 3D microfluidic chips Lab Chip, 2012, 12, 3866-3869. (Year: 2012).*
Schonfeld et al, "An optimised split-and-recombine micro-mixer with uniform 'chaotic' mixing" Lab Chip, 2004,4, 65-69. (Year: 2004).*

* cited by examiner

*Primary Examiner* — Dennis White
(74) *Attorney, Agent, or Firm* — Foley & Lardner LLP

(57) ABSTRACT

An example microfluidic mixer can include an inlet microfluidic channel portion and a fluid splitting channel portion including an overpass microfluidic channel to receive fluid from a first side of the inlet microfluidic channel portion and an underpass microfluidic channel to receive fluid from a second side of the inlet microfluidic channel portion, where the underpass microfluidic channel extends under the overpass microfluidic channel such that the channels overlap at their respective downstream ends. A fluid recombining channel portion is downstream of the fluid splitting portion and includes an angled recombining surface having an acute angle with respect to a direction of fluid flow, where the angled recombining surface is between the downstream ends of the overpass and underpass microfluidic channels. An outlet microfluidic channel portion is fluidly connected downstream from the fluid recombining channel portion.

11 Claims, 10 Drawing Sheets

MICROFLUIDIC MIXERS

BACKGROUND

Microfluidics relates to the behavior, control and manipulation of fluids that are geometrically constrained to a small, typically sub-millimeter, scale. Numerous applications employ passive fluid control techniques such as capillary forces. Capillary action refers to the spontaneous wicking of fluids into narrow channels without the application of external forces. In other applications, external actuation techniques are employed for a directed transport of fluid. A variety of applications for microfluidics exist, with various applications using differing controls over fluid flow, mixing, temperature, evaporation, and so on.

BRIEF DESCRIPTION OF THE DRAWINGS

Additional features of the disclosure will be apparent from the detailed description which follows, taken in conjunction with the accompanying drawings, which together illustrate, by way of example, features of the present technology.

Figure 1:
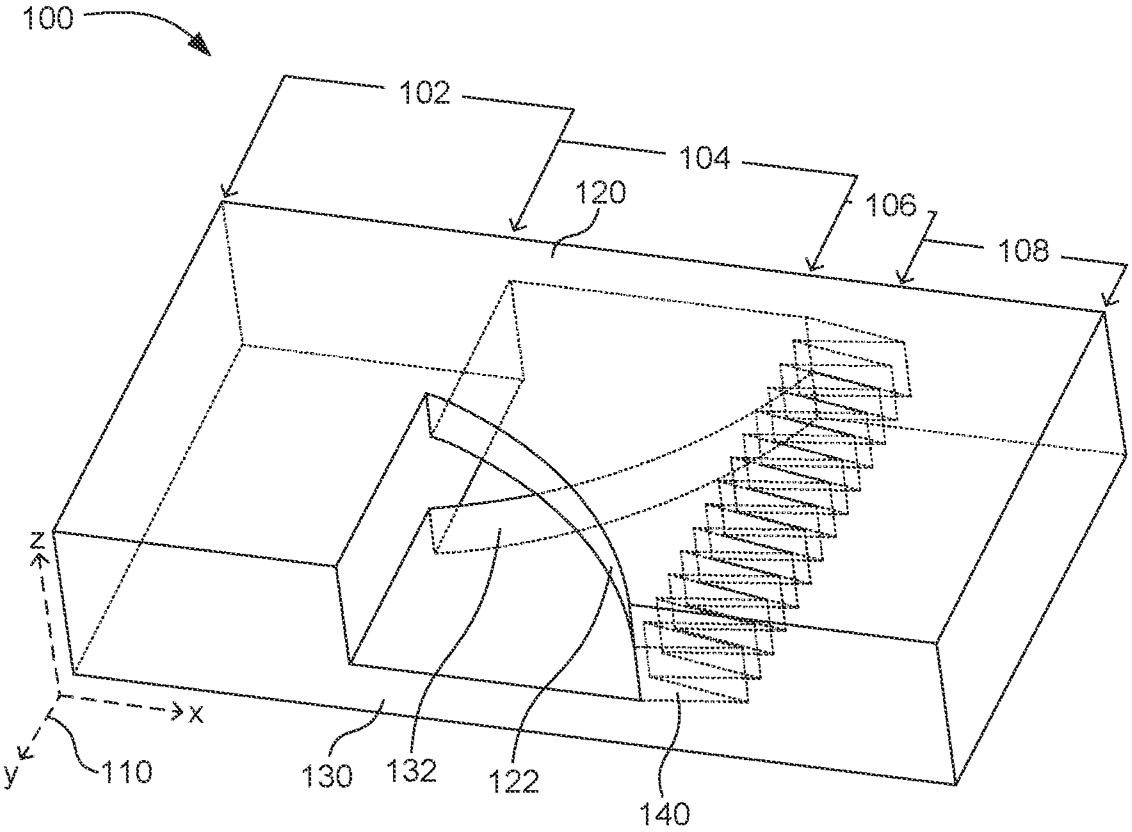
FIG. 1 is a perspective view of an example microfluidic mixer in accordance with the present disclosure.

Reference will now be made to several examples that are illustrated herein and specific language will be used herein to describe the same. It will nevertheless be understood that no limitation of the scope of the disclosure is thereby intended.

DETAILED DESCRIPTION

The present disclosure describes microfluidic mixers that can be primed with fluid by capillary action. These microfluidic mixers can mix fluid by splitting a fluid stream in a sideways direction into multiple portions and then stacking the multiple portions vertically. For example, a fluid stream can be split into a left side portion and a right side portion and then the left side portion can be stacked on top of the right side portion, or vice versa. This effectively "folds" the fluid stream on itself and reduces a diffusion distance for components of the fluid stream to mix by diffusion. Multiple mixers can be connected in series to fold the fluid stream multiple times to increase mixing by diffusion. The microfluidic mixers are also designed to be self-primed by capillary action. This means that a fluid can flow through the mixer by capillary action without any external application of pressure. The fluid priming the mixer in this way can also be mixed simultaneously with priming.

In one example, a microfluidic mixer includes an inlet microfluidic channel portion, a fluid splitting channel portion downstream from the inlet microfluidic channel portion, a fluid recombining channel portion downstream from the fluid splitting channel portion, and an outlet microfluidic channel portion. The fluid splitting channel portion includes an overpass microfluidic channel fluidly connected to the inlet microfluidic channel portion to receive fluid from a first side of the inlet microfluidic channel portion. The fluid splitting channel portion also includes an underpass microfluidic channel fluidly connected to the inlet microfluidic channel portion to receive fluid from a second side of the inlet microfluidic channel portion. The underpass microfluidic channel extends under the overpass microfluidic channel such that a downstream end of the overpass microfluidic channel overlaps with a downstream end of the underpass microfluidic channel. The fluid recombining channel portion is fluidly connected to the overpass microfluidic channel and the underpass microfluidic channel, and the fluid recombining channel portion includes an angled recombining surface having an acute angle with respect to a direction of fluid flow through the fluid recombining channel portion. The angled recombining surface is between the downstream end of the overpass microfluidic channel and the downstream end of the underpass microfluidic channel. The outlet microfluidic channel portion is fluidly connected to the fluid recombining channel portion to receive recombined fluid from the fluid recombining channel portion. In some examples, the microfluidic mixer can include a lower layer of photoresist material, a middle layer of photoresist material over the lower layer, and an upper layer of photoresist material over the middle layer. The inlet microfluidic channel portion and the outlet microfluidic channel can both be three-layer-high channels formed in the lower layer, middle layer, and upper layer. The overpass microfluidic channel can be a single-layer-high channel formed in the upper layer. The underpass microfluidic channel can be a single-layer-high channel formed in the lower layer. The overpass microfluidic channel can be separated from the underpass microfluidic channel by solid photoresist material in the middle layer. In further examples, the angled recombining surface can have a saw tooth shape including multiple angled faces, and an angle between adjacent angled faces is from 5° to 45°. The overpass microfluidic channel can include a first outwardly concave curved sidewall. A fluid cross-sectional area of the overpass microfluidic channel can increase in a fluid flow direction along the first outwardly concave curved sidewall. The underpass microfluidic channel can include a second outwardly concave curved sidewall curving in an opposite direction to the first outwardly concave curved sidewall. A fluid cross-sectional area of the underpass microfluidic channel can increase in a fluid flow direction along the second outwardly concave curved sidewall. In certain examples, the microfluidic mixer can also include a fluid splitting element in the fluid splitting channel portion, extending upstream from an upstream end of the overpass microfluidic channel and an upstream end of the underpass microfluidic channel. The fluid splitting element can divide fluid from the first and second sides of the inlet microfluidic channel portion. The fluid splitting channel portion can also include a first angled end wall to direct fluid from the first side of the inlet microfluidic channel portion into the overpass microfluidic channel, where the first angled end wall is positioned below the upstream end of the overpass microfluidic channel and where the first angled end wall forms an acute angle with a sidewall of the fluid splitting channel portion. The fluid splitting channel portion can also include a second angled end wall to direct fluid from the second side of the inlet microfluidic channel portion into the underpass microfluidic channel, where the second angled end wall is positioned above the upstream end of the underpass microfluidic channel, wherein the second angled end wall forms an acute angle with an opposite sidewall of the fluid splitting channel portion. In other examples, the microfluidic mixer can include a solid support pillar in the overpass microfluidic channel, or the underpass microfluidic channel, or both, where the solid support pillar has a tapered downstream edge having an acute angle such that a fluid cross-sectional area increases in the fluid flow direction along the tapered downstream edge. In certain examples, the inlet microfluidic channel portion and the outlet microfluidic channel portion can have a width from 20 μm to 300 μm and a height from 6 μm to 100 μm.

The present disclosure also describes microfluidic mixing systems. In one example, a microfluidic mixing system includes a microfluidic channel fluidly connected to a series of microfluidic mixers. Individual microfluidic mixers include a fluid splitting channel portion where the fluid splitting channel portion includes an overpass microfluidic channel and an underpass microfluidic channel that is fluidly separate from the overpass microfluidic channel. The individual microfluidic mixers also include a fluid recombining channel portion downstream from the fluid splitting channel portion. The fluid recombining channel portion includes an angled recombining surface having an acute angle with respect to a direction of fluid flow through the fluid recombining channel portion. The angled recombining surface is between a downstream end of the overpass microfluidic channel and a downstream end of the underpass microfluidic channel. The individual microfluidic mixers also include an outlet microfluidic channel portion downstream from the fluid recombining channel portion. The series of microfluidic mixers include a first microfluidic mixer and a second microfluidic mixer downstream relative to the first microfluidic mixer, where the outlet microfluidic channel portion of the first microfluidic mixer is fluidly connected to the fluid splitting channel portion of the second microfluidic mixer. In some examples, the microfluidic mixing system can include multiple fluid reservoirs connected to the microfluidic channel. The microfluidic mixing system can also include a self-priming reaction chamber connected downstream to the series of microfluidic mixers. In further examples, the microfluidic mixing system can include a micropump fluidly connected to pump fluid through individual microfluidic mixers or the series of microfluidic mixers.

The present disclosure also describes methods of mixing fluid. In one example, a method of mixing fluid includes introducing a fluid into an inlet microfluidic channel portion of a microfluidic mixer. The fluid is divided into a first portion of fluid on a first side of the inlet microfluidic channel portion and a second portion of fluid on a second side of the inlet microfluidic channel portion. The first portion flows, by capillary action, through an overpass microfluidic channel. The second portion of fluid flows, by capillary action, through an underpass microfluidic channel. The underpass microfluidic channel extends under the overpass microfluidic channel such that a downstream end of the overpass microfluidic channel overlaps with a downstream end of the underpass microfluidic channel. The first portion of fluid flows, by capillary action, from the overpass microfluidic channel into a fluid recombining channel portion along an angled recombining surface. The second portion of fluid flows, by capillary action, from the underpass microfluidic channel into the fluid recombining channel portion along the angled recombining surface, thereby recombining the second portion of fluid with the first portion of fluid. The angled recombining surface has an acute angle with respect to a direction of fluid flow through the fluid recombining channel portion, and the angled recombining surface is between the downstream end of the overpass microfluidic channel and the downstream end of the underpass microfluidic channel. The recombined first portion and second portion of fluid flows, by capillary action, from the fluid recombining channel portion into an outlet microfluidic channel portion. In some examples, the method can also include flowing the fluid from the outlet microfluidic channel portion through a series of multiple additional microfluidic mixers, where a total number of microfluidic mixers is from 4 to 20. In certain examples, no additional pressure may be applied to the fluid flowing through the microfluidic mixer besides the capillary action.

The microfluidic mixers and systems described herein can be incorporated into a variety of microfluidic devices. Microfluidic devices are widely used in life sciences and other applications. These devices typically include small microfluidic flow channels having dimensions on the μm-scale, such as channels having a width or height of less than 100 μm, or less than 50 μm, or less than 20 μm, in various examples. At these small scales, the forces acting on fluids in the microfluidic channels are dominated by viscous forces. The Reynolds number can be used to describe the relative importance of viscous forces and inertial forces on fluids. The Reynolds number is proportional to the width or diameter of a channel through which a fluid is flowing. When the Reynolds number is very low, viscous forces dominate over inertial forces. Since the width of microfluidic channels is very small, the Reynolds number is very low in these systems. As a result, a laminar flow regime characterizes the fluids within the microfluidic channels. Very little or no turbulent flow occurs in the microfluidic channels.

The dominance of laminar flow in microfluidic channels can make mixing difficult. At larger scales, mixing is often accomplished using turbulent and convective mixing, such as by stirring or mechanically agitating the fluid. However, little or no turbulent or convective mixing occurs in microfluidic channels. When two fluids are adjacent in a microfluidic channel, mixing can occur mostly by diffusion. However, diffusion is a slow process, even across the small distances within a microfluidic channel (e.g., less than 100 μm). The microfluidic mixers described herein can increase the speed of diffusion mixing by "folding" a fluid stream. In this case, "folding" refers to splitting the fluid stream into two or more portions and then recombining the portions of the stream. The direction of splitting and the direction of recombining can be different. For example, the fluid stream can be split in a side-to-side direction, such as splitting a left side of the fluid stream from a right side of the fluid stream. The split portions can then be stacked in a vertical direction, such as by stacking the left side portion on top of the right side portion or vice versa. In this example, the initial fluid stream may include two different fluids in unmixed layers, such as a bottom layer of a first fluid and a top layer of a second fluid. When the fluid stream is split into side portions, the result is two streams that have a bottom layer of the first fluid and a top layer of the second fluid. When the streams are recombined by stacking one stream on top of the other, the result is a recombined stream having four layers of fluid, with the layers of the first fluid interspersed with the layers of the second fluid. This reduces the effective diffusion distance between the two fluids and the time for mixing the fluids by diffusion is reduced by half or more.

In some cases, multiple microfluidic mixers can be connected in series to “fold” the fluid stream multiple times. Every time the stream is folded, the number of layers of fluid is multiplied by two. The thickness of the individual fluid layers is also divided by two. The fluid stream can become thoroughly mixed after being folded several times by several microfluidic mixers. In some examples, the number of microfluidic mixers connected in series can be from 4 to 20. However, any desired number can be used depending on the desired level of mixing and the properties of the fluids being mixed.

In addition to providing diffusive mixing of fluids in a microfluidic channel, the microfluidic mixers described herein can also allow the fluids to flow through the mixers by capillary action, without any external pressure being applied to drive fluid through the microfluidic mixers. The design of the microfluidic mixers can allow for priming by capillary action, even with high-contact angle fluids. At the small scale of microfluidic channels, certain forces such as adhesive and cohesive forces of liquids can become more significant compared to larger scales. For example, the behavior of water in microfluidic channels can be largely dictated by the adhesive forces of the water adhering to hydrophilic solid surfaces, and by the cohesive forces between water molecules, which may manifest as surface tension. Because the volume of water within a small microfluidic channel can be very small, the forces of gravity on the water may be less significant or negligible compared to adhesive and cohesive forces. When the solid wall surfaces of a microfluidic channel are hydrophilic, the adhesive forces between water and the microfluidic channel walls can cause water to spontaneously flow into the microfluidic channel by capillary action. This can occur regardless of the orientation of the microfluidic device since the force of gravity on the water may be negligible.

When a solid material has a strong adhesion with water, the solid material can be said to have a low contact angle with water. The contact angle refers to the angle between a solid surface and a surface of a water droplet at the interface between the droplet surface and the solid surface. When the solid material is more hydrophilic, the contact angle becomes more acute because the water droplet tends to spread out over the surface more. Solid materials that have a contact angle with water of less than 90° are considered to be hydrophilic, and materials that have a contact angle with water greater than 90° are considered to be hydrophobic. The contact angle between a fluid and a solid material can depend on both the fluid and the solid material. For example, a particular solid material may have a higher contact angle with pure water, but a lower contact with water that has a wetting agent added.

Some microfluidic devices can be manufactured and packaged in a dry state. In this state, microfluidic channels within the device may contain air instead of liquid. When the device is used, the microfluidic channels can be primed, meaning a liquid can be introduced into the microfluidic channels. It can be useful to prime the microfluidic channels through capillary action instead of using an external force such as a pump to force the liquid into the microfluidic channels. In order for the microfluidic channels to be capable of self-priming by capillary action, the microfluidic channels can be designed so that the adhesive forces between the liquid and the walls of the microfluidic channels overcomes the cohesive forces between water molecules. In other words, the liquid will preferentially continue to flow through the microfluidic channels because of the adhesive attraction to the walls of the channels instead of being held stationary by cohesive forces such as surface tension.

In some cases, any sudden increases in the cross-sectional area of a microfluidic channel may potentially cause the capillary action to stop because the cohesive forces of the liquid will tend to prevent the liquid-air interface (i.e., the meniscus) from growing to fill the larger cross-section. A sudden increase in the cross-sectional area of the channel can cause the meniscus to become convex which can create a positive capillary pressure and stop fluid advancement. One type of feature that can cause such a break in capillary action is a sharp turn in a microfluidic channel, such as a 90° bend. When liquid flows around a 90° bend, the meniscus may temporarily become convex as the effective cross-section of the channel increases at the corner of the bend. If the contact angle between the liquid and the channel walls is sufficiently low, then capillary action can continue around such a bend without issue. For example, if the contact angle is 60° or less, then the liquid can typically flow around a 90° bend by capillary action without interruption. However, if the contact angle is 70° or greater, then the liquid is likely to become stuck at the 90° bend and will not flow by capillary action around the bend.

As mentioned above, the microfluidic mixers described herein can be self-primed by capillary action, even with high contact angle fluids. The microfluidic mixers can have a design that does not include sudden increases in cross-sectional area that would cause fluid to become pinned, stopping capillary flow. Therefore, fluid can flow without any external applied pressure through the mixers during priming. The fluid can be mixed simultaneously. Thus, the mixers can mix fluid without any external energy or pressure being supplied.

The microfluidic mixers described herein can be formed from flat layers of a solid material, such as layers of photoresist. Any desired two-dimensional shaped features can be made by patterning and developing a layer of photoresist. This type of manufacturing process allows for a high level control over the shape of the microfluidic channels in two dimensions. However, this process does not allow full control of the shape in the third dimension, which is the height or elevation dimension (i.e., up and down). Additional layers of photoresist material can be deposited over the top of the first layer of photoresist. These additional layers can include differently shaped and located features such as microfluidic channels and other structures. Thus, this provides some control over the shape of microfluidic structures in the height dimension, but full control over the height dimension may not be available with this manufacturing process. This can be referred to as a “2.5 dimensional process.”

The microfluidic mixers described herein can be formed from a stack of multiple layers of solid material, such as the photoresist material described above. In some examples, a mixer can include an overpass microfluidic channel and an underpass microfluidic channel separated by a solid intermediate layer. In particular, the overpass microfluidic channel can be formed in a top layer of photoresist material, and the underpass microfluidic channel can be formed in a bottom layer of photoresist material. A solid intermediate layer of photoresist material can be between the top and bottom layers, separating the overpass microfluidic channel from the underpass microfluidic channel. Thus, this structure can be made with three or more layers of photoresist material.

An initial fluid stream can be divided into side portions that are directed into the overpass microfluidic channel and the underpass microfluidic channel. In certain examples, the initial fluid stream can flow in an inlet microfluidic channel that is a three-layer-high channel formed in three layers of photoresist material. The overpass microfluidic channel can be a one-layer-high channel formed in the top layer of photoresist material, and the underpass microfluidic channel can be a one-layer-high channel formed in the bottom layer of photoresist material. After the fluid has been split into the overpass and underpass channels, the fluid can then be recombined in an outlet microfluidic channel. In some examples, the outlet microfluidic channel can be a three-layer-high channel similar to the inlet microfluidic channel. If the fluid were to flow directly from the one-layer-high overpass and underpass channels into the three-layer-high outlet channel, then this could be the type of interface where fluid can become pinned because capillary flow stops at a sudden increase in cross-sectional area. However, the microfluidic mixers described herein can include a fluid recombining channel portion that allows the fluid to flow from the overpass and underpass channels into the outlet channel without being pinned.

The fluid recombining channel portion can include an angled recombining surface. This can be a surface angled at an acute angle with respect to the direction of fluid flow. The angled recombining surface can be between the downstream end of the overpass microfluidic channel and the downstream end of the underpass microfluidic channel. For example, the angled recombining surface can be formed in the intermediate layer of photo resist material. Since fluid pinning often occurs when the cross-sectional area increases suddenly, using an angled recombining surface as described herein can prevent pinning because the fluid cross-sectional area increases more gradually when the fluid flows past the angled recombining surface. As used herein, "fluid cross-sectional area" refers to an area of the fluid as measured on a plane that is perpendicular to the direction of fluid flow. If fluid is flowing in different directions at different locations on this plane, such as when the fluid is flowing around complex geometry, then the plane can be perpendicular to the average direction of fluid flow. The "average" direction of fluid flow can be the integral part of all flow vectors across the plane. As used herein, the statement "a fluid cross-sectional area increases in the fluid flow direction along the angled recombining surface" refers to the fluid cross-sectional area perpendicular to the average fluid flow direction, as defined above. This cross-sectional area increases as fluid flows from the beginning of the angled recombining surface toward the downstream end of the angled recombining surface. In other words, the angled recombining surface is angled in a way that gradually increases the cross-section from the overpass and underpass channels to the larger cross-section of the outlet microfluidic channel. It is noted that sudden decreases in the channel cross-sectional area do not cause such fluid pinning, and the microfluidic mixers can include decreases in channel cross-sectional area without any gradual change.

Although capillary action can drive the flow of fluid through the microfluidic mixers during initial priming, the flow may stop once the microfluidic device containing the microfluidic mixer has been fully primed. In some examples, a micropump can be included in the microfluidic device to drive continued flow of fluid through the microfluidic mixer after the mixer can been primed. The microfluidic mixers described herein can create a relatively small pressure drop when fluid is pumped through in this way. Placing multiple mixers in series can increase the pressure. However, adding additional mixers also increases the efficiency of mixing by diffusion. As explained above, the number of layers of the different fluids is doubled with every mixer in series. Therefore, the mixing efficiency increases at an exponential rate when additional mixers are added in series. In contrast, the pressure drop caused by additional mixers increases at a linear rate. An appropriate number of mixers can be selected to provide a high mixing efficiency with an acceptable pressure drop.

With the above description in mind, FIG. 1 shows one example microfluidic mixer 100 in accordance with the present disclosure. The volumes depicted in this figure represent the internal volume of the microfluidic mixer. The internal volume can be surrounded by a solid material such as a photoresist material. The microfluidic mixer includes an inlet microfluidic channel portion 102, a fluid splitting channel portion 104 downstream from the inlet microfluidic channel portion, a fluid recombining portion 106 downstream from the fluid splitting channel portion, and an outlet microfluidic channel portion 108 fluidly connected to the fluid recombining channel portion to receive recombined fluid from the fluid recombining channel portion. As used herein, the "inlet microfluidic channel portion," "fluid splitting channel portion," fluid recombining channel portion," and "outlet microfluidic channel portion" refer to segments of the microfluidic mixer along the length, or x-axis, of the mixer. These portions are shown by arrows and line segments delineated where one portion ends and the next portion begins. These are for the particular example shown, and in other examples the various portions referred to can begin and end in different locations.

In the example of FIG. 1, a coordinate axis 110 is shown including an x-axis, y-axis, and z-axis. The microfluidic mixers described herein can be oriented in any desired orientation and the orientation of the structures and components of the structures is not limited by terms such as "up," "above," "vertical," "horizontal," etc. However, for clarity in describing the microfluidic structures, the geometry of the structures is described herein in relation to the coordinate axis. Therefore, any reference to height, the vertical direction, up, down, etc., can refer to differences on the z-axis as shown in this figure. Structures that lie along the x-axis, the y-axis, or the x-y plane can be described as horizontal. As used herein, "elevation plane" refers to a plane in or parallel to the x-y plane. In other words, an elevation plane is a plane that is orthogonal to the z-axis as shown in this figure. Additionally, the "width" of the microfluidic channels described herein can refer to an inner dimension in the y-axis direction, and "length" can refer to an inner dimension in the x-axis direction.

The inlet microfluidic channel portion 102 shown in FIG. 1 is a simple microfluidic channel. Fluid can flow through this channel without any splitting of the fluid stream. The fluid splitting channel portion 104 begins where the geometry of the microfluidic mixer 100 causes the fluid stream to split into side portions. The fluid splitting channel portion includes an overpass microfluidic channel 120 and an underpass microfluidic channel 130. In this example, the overpass microfluidic channel and the underpass microfluidic channel have inlets that receive fluid from a side of the inlet microfluidic channel portion. When viewed along the direction of flow, the overpass microfluidic channel receives fluid from the left side of the inlet microfluidic channel portion and the underpass microfluidic channel receives fluid from the right side of the inlet microfluidic channel portion. The overpass microfluidic channel has a first outwardly concave curved sidewall 122 that curves gradually outward to increase the fluid cross-sectional area of the overpass. The rate of curvature can be selected so that fluid flows through the channel by capillary action without becoming pinned. The underpass microfluidic channel has a second outwardly concave curved sidewall 132 curving in the opposite direction. These curved sidewalls cause the overpass and underpass to overlap at their respective downstream ends. In particular, the downstream end of the overpass microfluidic channel overlaps with the downstream end of the underpass microfluidic channel when viewed from the z-axis direction. It is noted that this is merely one example of the shape of the overpass and underpass channels. In other examples, the overpass and underpass channels can have different shapes, with or without curved sidewalls, so long as the downstream ends overlap. Additionally, the downstream ends of the overpass and underpass channels can overlap fully or partially in various examples.

The fluid recombining channel portion 106 begins where the fluid splitting channel portion 104 ends. The fluid recombining channel portion is fluidly connected downstream of the overpass microfluidic channel 120 and the underpass microfluidic channel 130 so that fluid can flow from these channels into the fluid recombining channel portion. The fluid recombining channel portion includes an angled recombining surface 140 having an acute angle with respect to a direction of fluid flow through the fluid recombining channel portion. The angled recombining surface (in the z-axis direction) is between the downstream end of the overpass microfluidic channel and the downstream end of the underpass microfluidic channel. In this example, the angled recombining surface has a saw tooth shape that includes multiple angled faces forming the "teeth." However, other examples can include an angled surface having another shape, such as a single surface that extends across the width of the microfluidic mixer 100, or a saw tooth shape that has a different number of "teeth," or another shape. The angled recombining surface can have the effect of gradually increasing a fluid cross-section as fluid flows along the angled surface. This can prevent the fluid from becoming pinned, which could occur at the outlet of the overpass and underpass microfluidic channels if the angled recombining surface was not present. The outlet microfluidic channel portion 108 is fluidly connected to the fluid recombining channel portion to receive recombined fluid from the fluid recombining channel portion. In this example, the outlet microfluidic channel portion is a simple channel with a rectangular cross-section, similar to the inlet microfluidic channel portion.

Figure 2A:
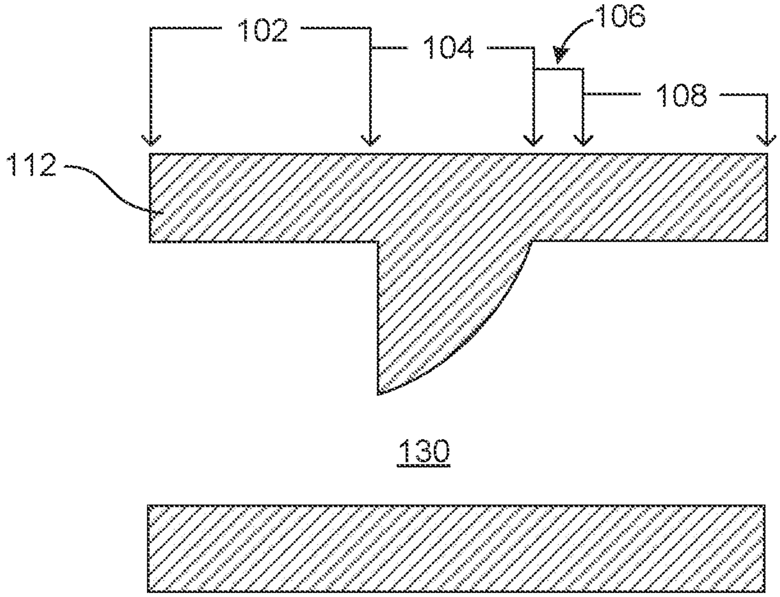
FIGS. 2A-2C are top-down views of layers of solid material that can be stacked to form the microfluidic mixer of FIG. 1.
Figure 2B:
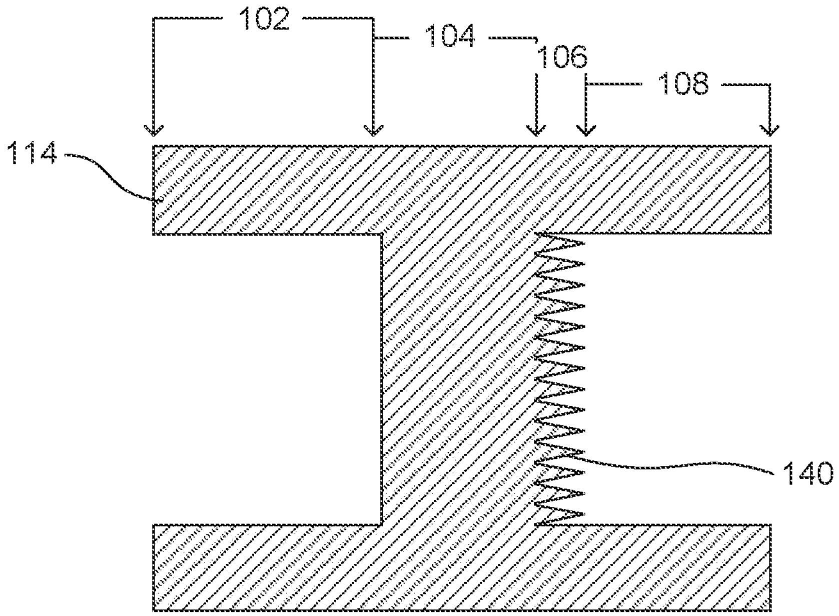
Figure 2C:
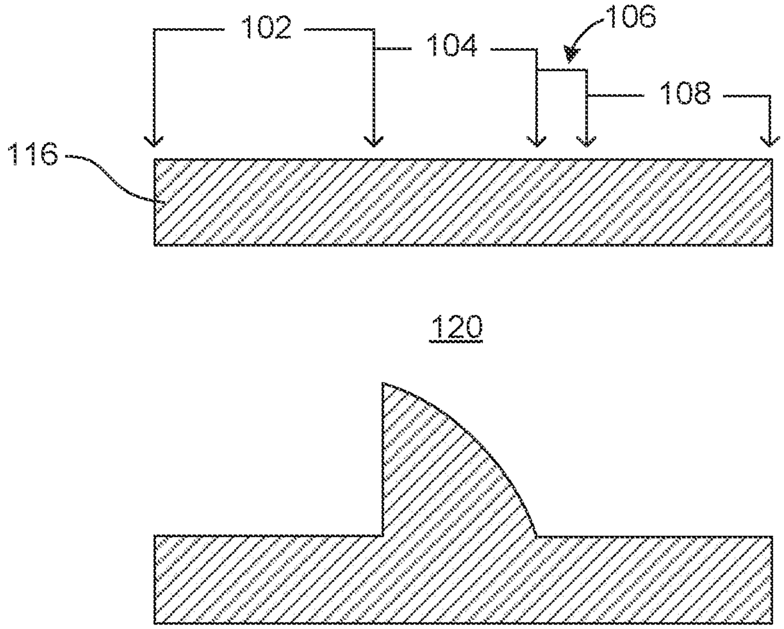

FIGS. 2A-2C show examples of layers that can be formed using a two-dimensional patterning process and then stacked to form the microfluidic mixer shown in FIG. 1. FIG. 2A shows a lower layer of photoresist material 112. This layer includes a bottom part of the inlet microfluidic channel portion 102, the underpass microfluidic channel 130 of the fluid splitting channel portion 104, a bottom part of the fluid recombining channel portion 106, and a bottom part of the outlet microfluidic channel portion 108. These features are formed as void spaces in the photoresist layer, with solid photoresist material around them.

FIG. 2B shows a middle layer 114 of photoresist material that can be stacked over the lower layer 112. The middle layer has a part of the inlet microfluidic channel portion 102 formed as a void space. In the fluid splitting channel portion 104, the middle layer is solid. Therefore, the middle layer blocks fluid from flowing in the middle layer of the fluid splitting channel portion. The fluid is directed either into the underpass microfluidic channel in the lower layer, or into the overpass microfluidic channel in the upper layer. The solid material of the middle layer separates the underpass microfluidic channel from the overpass microfluidic channel. The middle layer also includes the angled recombining surface 140 in the fluid recombining channel portion 106. In this example, the angled recombining surface has a saw tooth shape. The individual faces of the saw tooth shaped surface are angled at acute angles with respect to the direction of fluid flow (i.e., the x-axis shown in FIG. 1). The specific angle referred to is the angle in the x-y plane or horizontal plane. An angle can be conceptualized as a vertex with two rays extending from the vertex. When an angle is "in" a plane, the two rays both lie in that plane. The angle is shown clearly in FIG. 2B as viewed from above. In this particular saw tooth shape, the angle between adjacent faces can be from 5° to 45° in some examples. It is noted that the angled faces are not angled with respect to the z-axis. Instead, the faces are parallel to the z-axis. This can be due to the process used to form the layers of photoresist material. As explained above, in some examples the process can allow for control over two-dimensional shapes in the layers but not control over shapes in the z-axis direction. It is noted that some processes can allow a small degree of control over the z-axis direction. For example, the wall segments can be made with slight angles, such as 15° or less, in the z-axis direction. Therefore, wall segments in the microfluidic mixers described herein may not be perfectly vertical and may have such slight angles in some examples. However, the microfluidic mixer designs described herein do not rely on forming angles in the z-axis direction. The middle layer of photoresist material also includes a part of the outlet microfluidic channel portion 108. The fluid can flow along the angled recombining surface and then on into the outlet microfluidic channel portion after being recombined.

FIG. 2C shows an upper layer 116 of photoresist material that can be stacked over the middle layer. This layer includes a void space for the top part of the inlet microfluidic channel portion 102, the overpass microfluidic channel 120 in the fluid splitting channel portion 104, a top part of the fluid recombining channel portion 106, and a top of the outlet microfluidic channel portion 108. Although not shown in these figures, in some examples additional layers of solid material can be added to form a solid ceiling and floor for the microfluidic mixer.

The designs of the layers making up the microfluidic mixer can allow for a self-priming microfluidic mixer that can be formed using a two-dimensional patterning process on the individual layers. Depending on the process, the individual layers can be formed separately and then stacked, or one layer can be formed directly on another layer that has already been formed. Although photoresist material is an example described herein, other solid materials can also be used to make the microfluidic mixers. In particular, materials that can be shaped using a two-dimensional process can be useful.

The angled recombining surface can be helpful for allowing fluid to flow through the microfluidic mixer by capillary action without becoming pinned. The specific angles of the angled recombining surface can vary depending on several factors. For a given geometry of the microfluidic mixer and a given contact angle between the fluid and the solid walls of the microfluidic mixer, there may exist a particular angle above which the fluid will get stuck and be pinned at the downstream end of the overpass microfluidic channel and the downstream end of the underpass microfluidic channel. However, below this angle the fluid can continue to flow through the fluid recombining channel portion by capillary action. As a guideline, the angle can be greater when a fluid with a lower contact angle is used. Conversely, the angle can be smaller when a higher contact angle fluid is used. In some examples, the angle between the angled recombining surface and the direction of flow can be from 5° to 45°. Acute angles within this range can be suitable for a variety of fluids having a variety of contact angles with the solid material of the microfluidic mixer walls. In some examples, the fluid can have a contact angle greater than 70° with the walls. In further examples, the acute angle can be from 5° to 35°, or from 5° to 25°, or from 5° to 20°, or from 10° C. to 20°, or from 20° to 45°, or from 30° to 45°, or from 20° to 35°. If the angled recombining surface has a saw tooth shape with multiple faces meeting at an acute angle, then the acute angle between adjacent faces of the saw tooth shape can also be within any of the angle ranges listed above. The fluid and/or the solid material of the walls can also vary, and the contact angle of the fluid with the wall material can be from 70° to 89°, or from 70° to 85°, or from 70° to 80°, or from 70° to 75°, or from 75° to 80°, or from 75° to 85°, in various examples. In some examples, the angle can be determined using the following formula. For a contact angle of $\theta$, the acute angle $\alpha$ may satisfy the condition $\alpha<2*(90°-\theta)$. For example, for a contact angle $\theta=70°$, the acute angle can be $\alpha<40°$. For a contact angle of $\theta=80°$, the acute angle can be $\alpha<20°$.

Although a specific angle may exist that separates microfluidic mixer designs that can be successfully primed using capillary action from designs that will have issues with fluid pinning, this angle can vary depending on the contact angle of the fluid and on the specific geometry of the various channels in the microfluidic mixer. For example, the height and width of the overpass microfluidic channel, and the underpass microfluidic channel, and the outlet microfluidic channel portion, can affect the capillary action. The height, width, and length of the fluid recombining portion and the shape of the angled recombining surface can also affect the capillary action. Mathematical formulae can provide some guidance for selecting an angle for the angled recombining surface. For example, the "perimeter priming rule" uses the following formula:

$$\cos\theta > \frac{P_{LG}}{P_{LW}}$$

where $\theta$ is the contact angle between the fluid and the channel wall material, $P_{LG}$ is the perimeter of the liquid-gas interface in a cross-section, and $P_{LW}$ the perimeter of the liquid-solid interface in the cross-section. For the example of pure water in a channel made from the photoresist material SU8, the contact angle is 80°. When the equation above is solved for $P_{LW}$ in terms of $P_{LG}$ with an angle of 80°, the result is $P_{LW}=5.76P_{LG}$. In other words, the perimeter of the liquid-wall interface can be greater than 5.76 times the perimeter of the liquid-gas interface. Fluid will flow by capillary force through a channel that is opening to a greater width as long as the opening angle of the walls is not greater than a. In some circumstances, these formulae may be useful as a guideline, but it can be difficult to determine the precise perimeter of liquid-wall and liquid-gas interfaces when liquid flows through a complex three-dimensional geometry. In practice, a particular geometry can be tested by physically producing the geometry and determining whether the structure can be self-primed, or by using a computer model that calculates forces of adhesion and surface tension on liquid as the liquid flows through the microfluidic structure.

Figure 3:
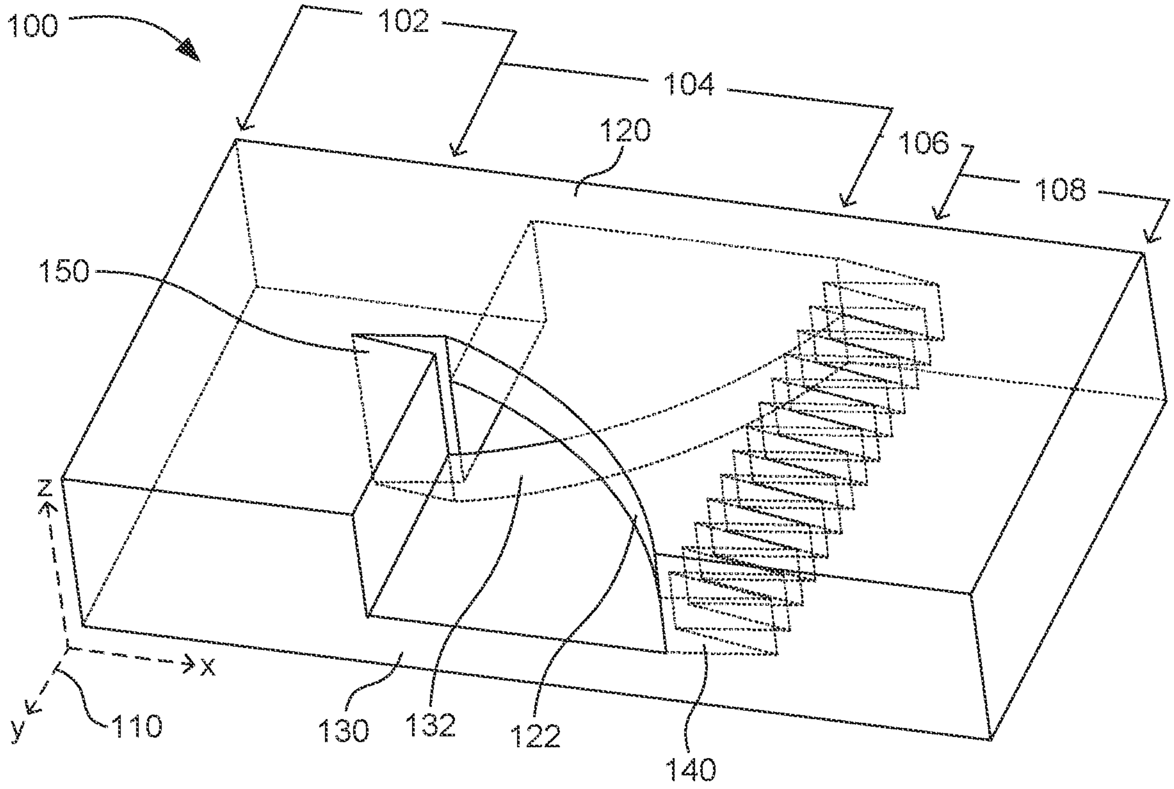
FIG. 3 is a perspective view of another example microfluidic mixer in accordance with the present disclosure.

FIG. 3 shows another example microfluidic mixer 100. This microfluidic mixer has a similar inlet microfluidic channel portion 102 as in the previous example. In the fluid splitting channel portion 104 of this example, the microfluidic mixer includes a fluid splitting element 150. The fluid splitting element is a solid wedge extending upstream from the upstream end of the overpass microfluidic channel 120 and the underpass microfluidic channel 130. The fluid splitting element helps divide the fluid flowing from the inlet microfluidic channel portion into two side portions so that the side portions can be directed into the overpass microfluidic channel and the underpass microfluidic channel. In some examples, the fluid splitting element can extend from a floor of the microfluidic mixer to a ceiling of the microfluidic mixer. In other examples, the fluid splitting element can have other shapes. In this example, the fluid splitting portion is defined as beginning at the tip of the fluid splitting element and extending to the downstream ends of the overpass microfluidic channel and the underpass microfluidic channel. The remaining features of this design are similar to the previous example, including the outwardly curved sidewalls 122, 132, the fluid recombining channel portion 106, the angled recombining surface 140, and the outlet microfluidic channel portion 108.

Figure 4A:
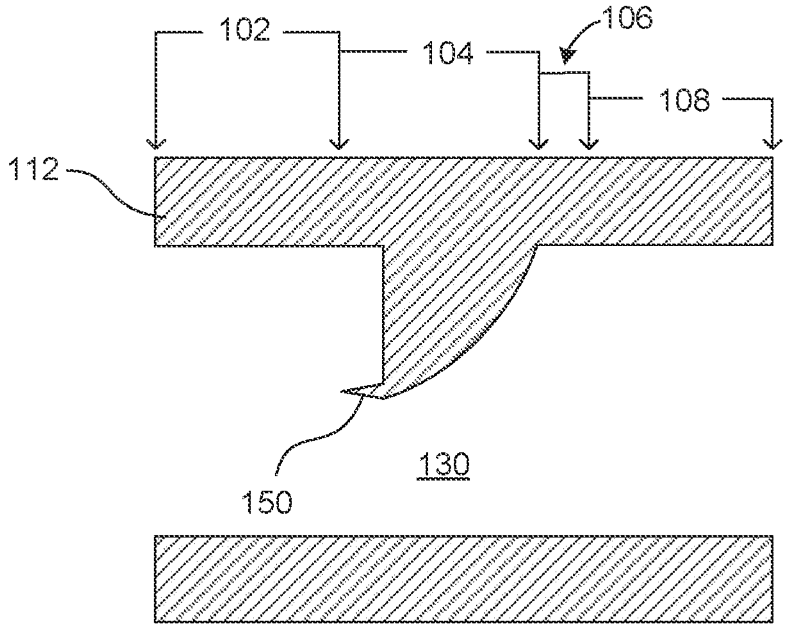
FIGS. 4A-4C are top-down views of layers of solid material that can be stacked to form the microfluidic mixer of FIG. 3.
Figure 4B:
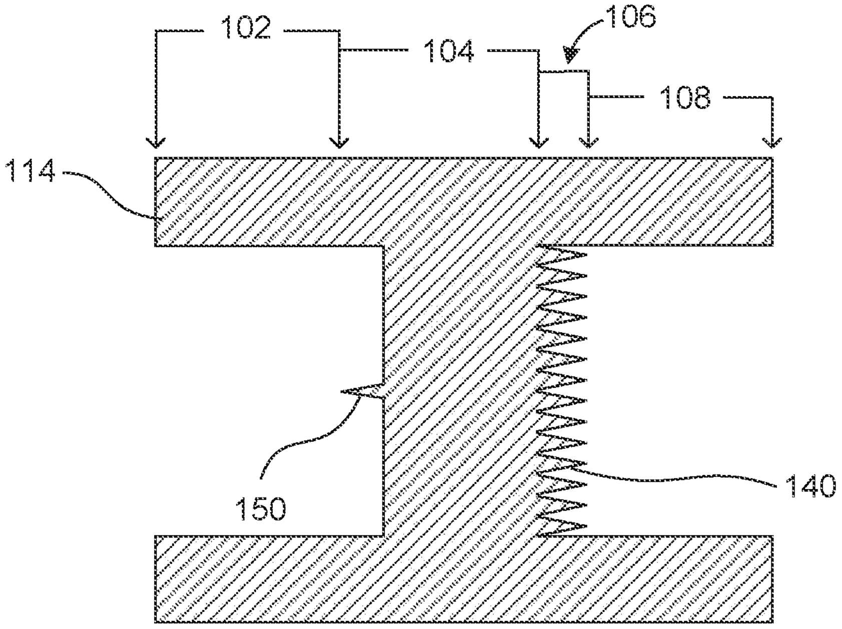
Figure 4C:
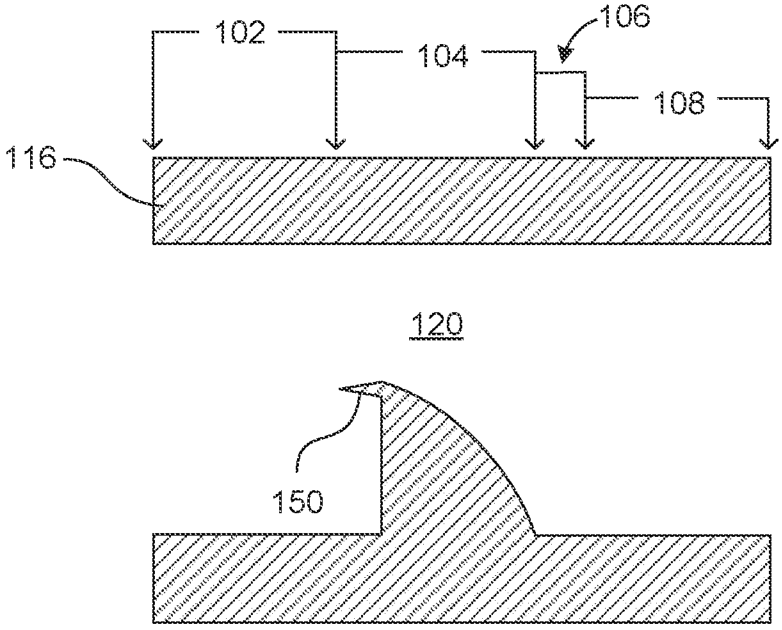

FIGS. 4A-4C show top plan views of several layers of solid material that can be stacked to form the microfluidic mixer of FIG. 3. FIG. 4A shows a lower layer 112 that includes part of the inlet microfluidic channel portion 102 at an upstream end. The fluid splitting channel portion 104 is downstream of the inlet microfluidic channel portion. In this example, the fluid splitting channel portion begins at the tip of the fluid splitting element 150, which is also formed in this layer. The lower layer also includes the underpass microfluidic channel 130, a part of the fluid recombining channel portion, and a part of the outlet microfluidic channel portion.

FIG. 4B shows a middle layer 114 that includes a middle part of the inlet microfluidic channel portion 102. In the fluid splitting channel portion 104, a middle part of the fluid splitting element 150 is formed. The fluid splitting channel portion also includes a solid section that separates the underpass microfluidic channel from the overpass microfluidic channel. The same type of saw tooth shaped angled recombination surface 140 is formed in the fluid recombining channel portion 106. The middle layer also includes a middle part of the outlet microfluidic channel portion formed as a void space in the middle layer.

FIG. 4C shows an upper layer 116 that includes a top part of the inlet microfluidic channel portion 102. A top part of the fluid splitting element 150 is also formed in the fluid splitting channel portion 104. The other features of this design are the same is in the previous example, including the overpass microfluidic channel 120, a top part of the fluid recombining channel portion 106, and a top part of the outlet microfluidic channel portion 108.

Figure 5:
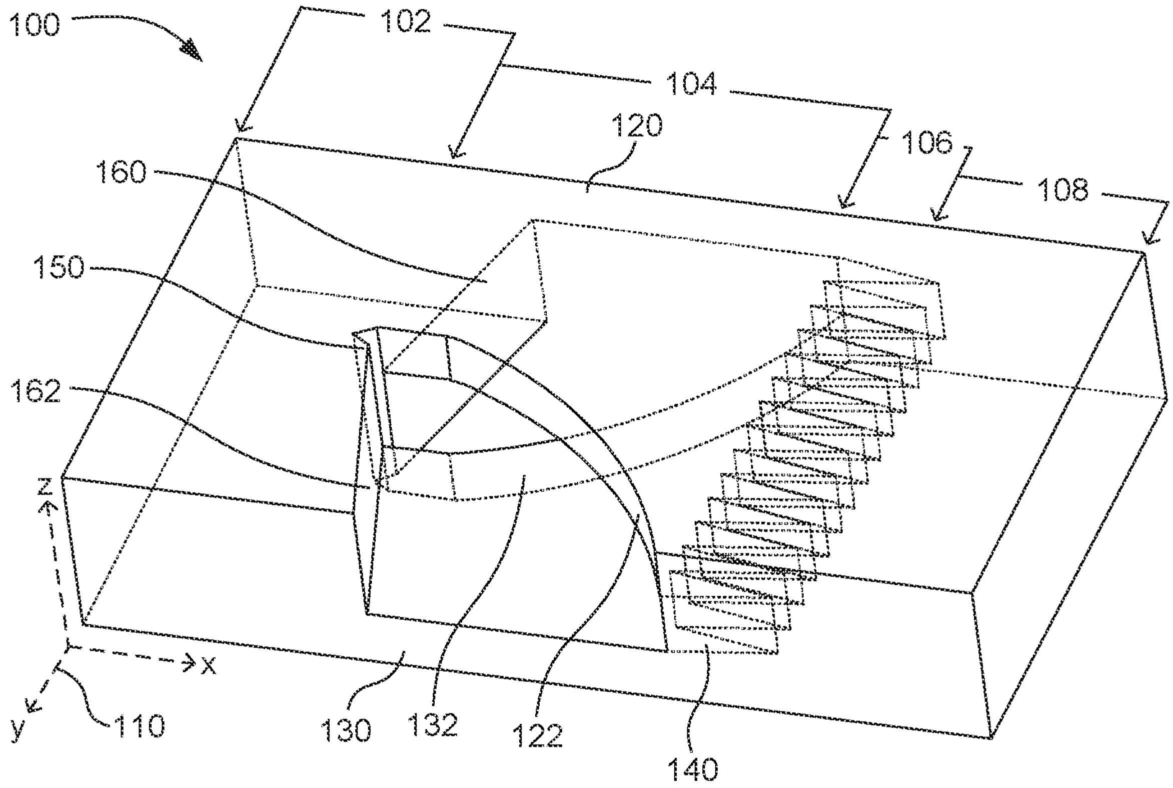
FIG. 5 is a perspective view of another example microfluidic mixer in accordance with the present disclosure.

Another example microfluidic mixer is shown in FIG. 5. This microfluidic mixer 100 is designed with angled end walls in the fluid splitting channel portion 104. When priming microfluidic mixers, it has been found that air bubbles can sometimes be trapped in corners that have 90° or nearly 90° angles. In the previous examples, such corners were present at the upstream end of the fluid splitting channel portion. However, it has been found that acute angled corners greatly reduce the trapping of air bubbles during priming. Accordingly, the example of FIG. 5 includes a first angled end wall 160 on a first side to direct fluid from the first side of the inlet microfluidic channel portion into the overpass microfluidic channel 120. The first angled end wall is positioned below the upstream end of the overpass microfluidic channel and the first angled end wall forms an acute angle with the side wall of the fluid splitting channel portion. A second angled end wall 162 is on the other side of the fluid splitting channel portion. The second angled end wall directs fluid from a second side of the inlet microfluidic channel portion into the underpass microfluidic channel 130. The second angled end wall is positioned above the upstream end of the underpass microfluidic channel and the second angled end wall forms an acute angle with an opposite sidewall of the fluid splitting channel portion. In some examples, the acute angle formed between the angled end walls and the sidewalls can be from 10° to 80°, or from 20° to 70°, or from 30° to 60°. This design also includes similar features to the previous design, including an inlet microfluidic channel portion 102, a fluid recombining channel portion 106, an outlet microfluidic channel portion 108, a fluid splitting element 150, and an angled recombining surface 140.

Figure 6A:
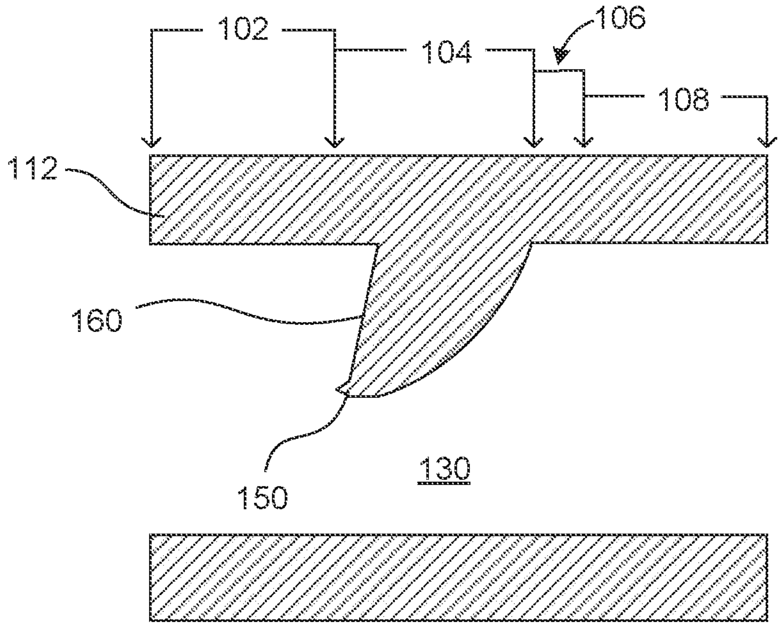
FIGS. 6A-6C are top-down views of layers of solid material that can be stacked to form the microfluidic mixer of FIG. 5.
Figure 6B:
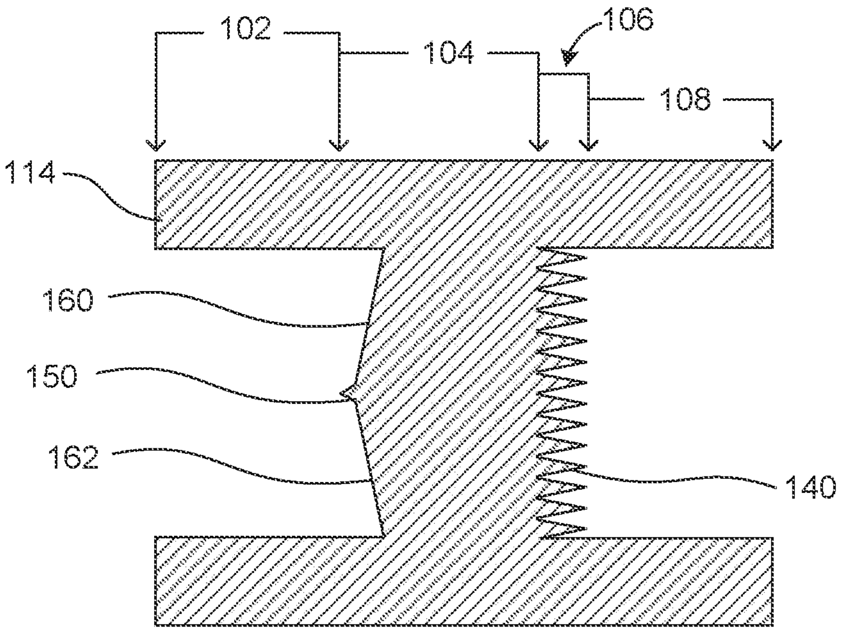
Figure 6C:
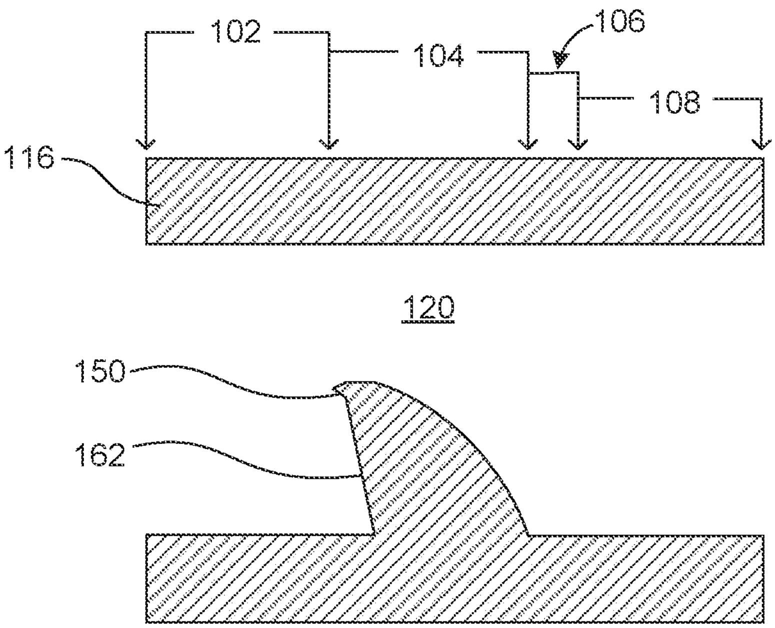

FIGS. 6A-6C show layers of solid material that can be stacked to form the microfluidic mixer shown in FIG. 5. FIG. 6A is a top plan view of a lower layer 112 of solid material. In this view, the acute angle between the first angled end wall 160 and the sidewall can be seen. The angled end wall extends from the sidewall to the fluid splitting element 150. This lower layer also includes similar features to previous examples, including a bottom part of the inlet microfluidic channel portion 102, the fluid splitting channel portion 104, the underpass microfluidic channel 130, the bottom part of the fluid recombining channel portion 106, and the bottom part of the outlet microfluidic channel portion.

FIG. 6B is a top plan view of a middle layer 114 of solid material that can be stacked over the lower layer. This middle layer includes part of the first angled end wall 160 and the second angled end wall 162. This layer also includes similar features to the previous examples, including a middle part of the inlet microfluidic channel portion 102, a middle part of the fluid splitting element 150, a middle part of the fluid splitting channel portion 104, a middle part of the fluid recombining channel portion 106 including the angled recombining surface 140, and a middle part of the outlet microfluidic channel portion 108.

FIG. 6C is a top plan view of an upper layer 116 of solid material that can be stacked over the middle layer. The upper layer includes the top part of the second angled end wall 162. The upper layer also includes the top part of the inlet microfluidic channel portion 102, the top part of the fluid splitting channel portion 104, the top part of the fluid splitting element 150, the overpass microfluidic channel 120, the top part of the fluid recombining channel portion 106, and the top part of the outlet microfluidic channel portion 108.

In some cases, it can be useful to make the overpass microfluidic channel and the underpass microfluidic channel wider in order to accommodate more fluid flow. However, some solid materials may sag if a thin layer of the material is made to cover a large space without structural support. Accordingly, in some examples, a solid support pillar can be formed in the overpass microfluidic channel, or in the underpass microfluidic channel, or both. In certain examples, multiple support pillars can be included and the support pillars can be spaced apart in the x-axis and/or y-axis directions to allow fluid to flow between the support pillars. Depending on the design of the support pillars, the support pillars could potentially cause fluid pinning. This would occur if the support pillars are shaped such that the fluid cross-sectional area increases suddenly when fluid flows past the support pillars. In order to avoid fluid pinning, the support pillars can have a tapered downstream edge with an acute angle so that the fluid cross-sectional area increases in the fluid flow direction along the tapered downstream edge. As used herein, the statement "a fluid cross-sectional area increases in the fluid flow direction along the tapered downstream edge" refers to the fluid cross-sectional area perpendicular to the average fluid flow direction, as defined above. This cross-sectional area increases as fluid flows from the beginning of the taper toward the downstream end of the tapered edge. In other words, the taper in the support pillar causes the support pillar to become narrower and this provides space for the cross-sectional area of the fluid to grow as the fluid flows along the taper. In certain examples, the support pillars can be diamond-shaped when viewed from above. In further examples, the downstream edge of the support pillars can be aligned with the angled recombining surface. When the angled recombining surface has a saw tooth shape, the downstream edge of a support pillar can be aligned with one of the "teeth" of the angled recombining surface.

Figure 7:
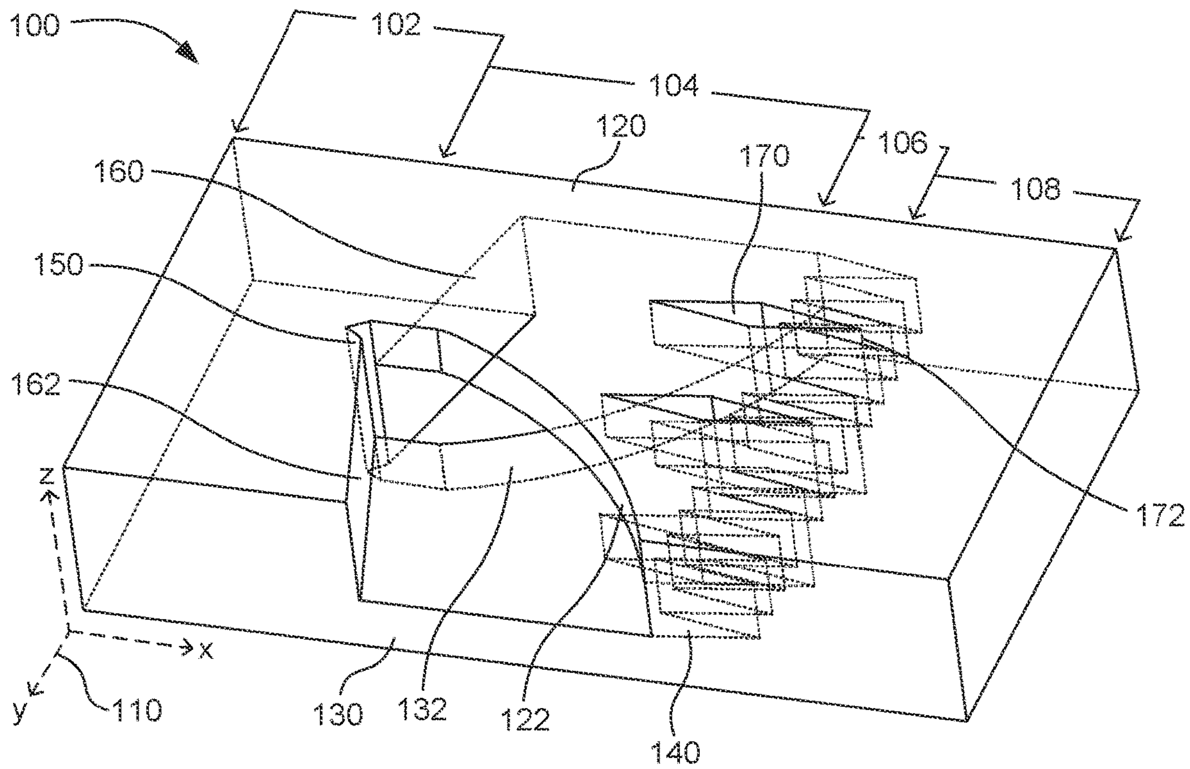
FIG. 7 is a perspective view of yet another example microfluidic mixer in accordance with the present disclosure.

FIG. 7 shows an example microfluidic mixer 100 that includes two support pillars 170 in the overpass microfluidic channel 120 and two support pillars in the underpass microfluidic channel 130. The support pillars are formed as diamond-shaped bodies of solid material that extend from a floor of the microfluidic channel to a ceiling of the microfluidic channel. The support pillars have tapered downstream edges 172 that are aligned with some of the faces of the angled recombining surface 140. The support pillars are also spaced apart one from another and spaced apart from sidewalls of the microfluidic channels to allow fluid to flow past the support pillars. This example also has similar features to the previous examples, including an inlet microfluidic channel portion 102, a fluid splitting channel portion 104, a fluid splitting element 150, angled end walls 160 and 162, outwardly concave curved sidewalls 122 and 132, a fluid recombining channel portion 106, and an outlet microfluidic channel portion 108.

Figure 8A:
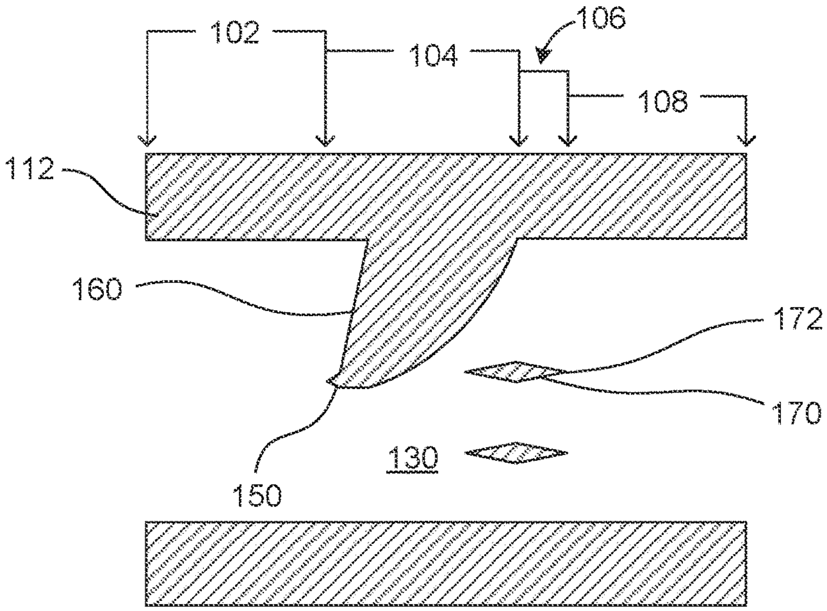
FIGS. 8A-8C are top-down views of layers of solid material that can be stacked to form the microfluidic mixer of FIG. 7.
Figure 8B:
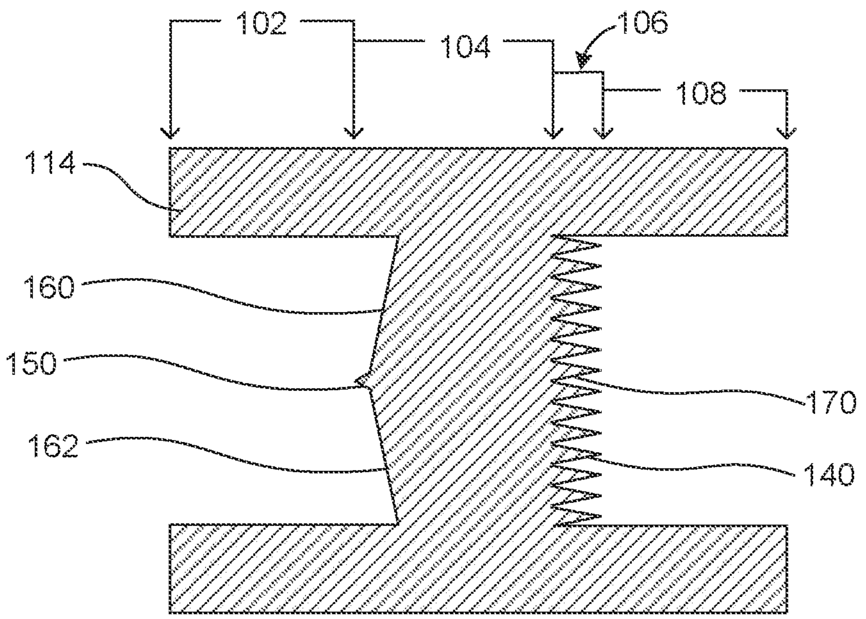
Figure 8C:
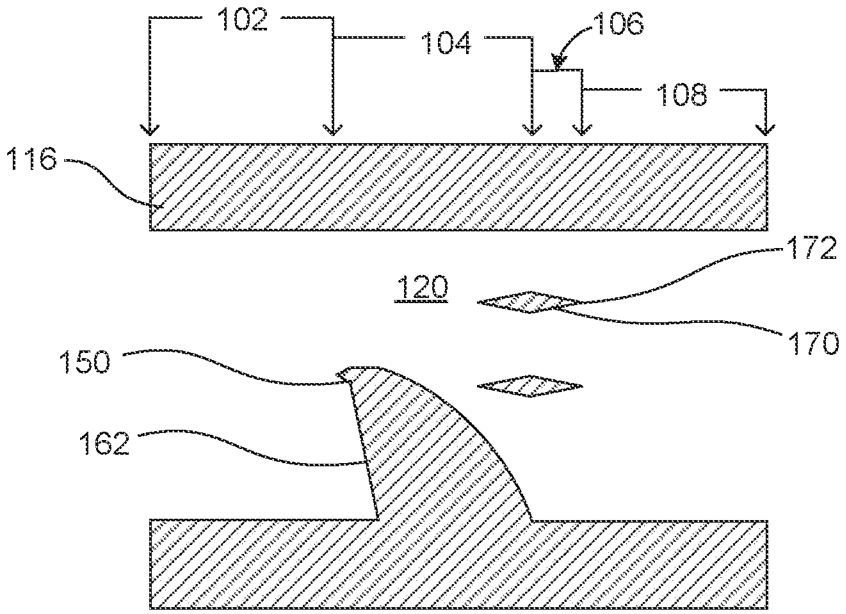

FIGS. 8A-8C show layers of solid material that can be stacked to form the microfluidic mixer of FIG. 7. FIG. 8A shows a top plan view of a lower layer 112 of solid material. This layer includes a void space that forms a bottom part of the inlet microfluidic channel portion 102 and a bottom part of the fluid splitting channel portion 104. A bottom part of the fluid splitting element 150 is formed as a wedge of solid material at the upstream end of the fluid splitting channel portion. The first angled end wall 160 is also formed in the lower layer. Two support pillars 170 are in the underpass microfluidic channel 130. More specifically, the upstream end of the support pillars is in the underpass microfluidic channel and the downstream end is in the fluid recombining channel portion 106. The support pillars have a tapered downstream edge 172 that is aligned with the angled recombining surface. The lower layer also includes a void space that forms a bottom part of the outlet microfluidic channel portion 108.

FIG. 8B shows a middle layer 114 of solid material that can be stacked on the lower layer. This middle layer includes similar features to the middle layer of the previous example, including a middle part of the inlet microfluidic channel portion 102, a middle portion of the fluid splitting channel portion 104, a middle part of the fluid splitting element 150, the angled end walls 160 and 162, a solid layer separating the underpass microfluidic channel from the overpass microfluidic channel, a middle part of the fluid recombining channel portion 106, an angled recombining surface 140, and a middle part of the outlet microfluidic channel portion 108. A support pillar is designated as 170. This is a “tooth” of the saw tooth angled recombining surface that forms a part of one of the support pillars. Although this tooth forms a part of a support pillar when the other layers are stacked with the middle layer, the middle layer alone actually has the same design as the middle layer in the previous example.

FIG. 8C is a top plan view of an upper layer 116 of solid material that can be stacked over the middle layer. The upper layer includes an overpass microfluidic channel 120 with two support pillars 170 in the overpass microfluidic channel. More specifically, the support pillars have an upstream end in the overpass microfluidic channel and a downstream end in the fluid recombining channel portion 106. The support pillars have tapered downstream edges 172 that are aligned with some faces of the angled recombining surface in the middle layer. The upper layer also includes similar features to the previous examples, including a top part of the inlet microfluidic channel portion 102, a top part of the fluid splitting channel portion 104, a top part of the fluid splitting element 150, a top part of the second angled end wall 162, and a top part of the outlet microfluidic channel portion 108.

As mentioned above, microfluidic devices often include channels with a width on the order of 100 μm or smaller. However, in some cases wider flow channels may be used if the channels have a smaller height. For example, the channels can have a width greater than 100 μm and a height that is 100 μm or less. These can still be considered “microfluidic channels.” In the microfluidic mixers described herein, in various examples the inlet microfluidic channel portion and/or the outlet microfluidic channel portion can be channels with a width from 20 μm to 300 μm. In further examples, these channels can have a width from 40 μm to 200 μm, or from 50 μm to 150 μm, or from 80 μm to 120 μm. The inlet and outlet channels can have a height from 6 μm to 100 μm, or from 10 μm to 80 μm, or from 20 μm to 60 μm, or from 30 μm to 50 μm, in some examples. In certain examples, the inlet microfluidic channel portion and the outlet microfluidic channel portion can have identical widths and heights. This can allow multiple microfluidic mixers to be connected in series easily with the same channel dimensions between the mixers.

In further examples, the overpass microfluidic channel and the underpass microfluidic channel can have an upstream end width and a downstream end width. The upstream end width of the overpass and/or the underpass channel can be smaller than the downstream end width. In certain examples, the downstream end width of the overpass and/or underpass microfluidic channel can be identical to the width of the outlet microfluidic channel portion. In other examples, the downstream end width can be from 70% to 100% of the width of the outlet microfluidic channel portion. The upstream end of the overpass and underpass microfluidic channels can be designed to receive fluid from different sides of the inlet microfluidic channel portion. In some examples, the upstream end of the overpass and/or underpass microfluidic channel can have a width that is smaller than the width of the inlet microfluidic channel portion. In certain examples, the upstream end width of the overpass and/or underpass microfluidic channel can be from 30% to 70% of the inlet microfluidic channel portion width, or from 40% to 60% of the inlet microfluidic channel portion width, or from 40% to 48% of the inlet microfluidic channel portion width, or less than half of the inlet microfluidic channel portion width. In further examples, the upstream ends of the overpass and underpass microfluidic channels can be positioned so that the upstream ends partially overlap when viewed from above (in the z-axis direction) or so that the upstream ends do not overlap. In certain examples, the upstream end of the overpass microfluidic channel can be positioned adjacent to a sidewall of the inlet microfluidic channel portion and the upstream end of the underpass microfluidic channel can be positioned adjacent to an opposite sidewall of the inlet microfluidic channel portion. In some examples, the upstream end of the overpass microfluidic channel can be in an upper left area when viewed in the direction of fluid flow (along the x-axis) and the upstream end of the underpass microfluidic channel can be in a lower right area. In other examples, the upstream end of the overpass microfluidic channel can be in an upper right area and the upstream end of the underpass microfluidic channel can be in a lower left area.

The overpass and/or underpass microfluidic channels can have a channel length from the upstream end to the downstream end. In some examples, the channel length can be from 40 μm to 160 μm, or from 50 μm to 140 μm, or from 60 μm to 120 μm, or from 80 μm to 100 μm. The overpass and/or underpass microfluidic channels can include an outwardly concave curved sidewall. In some examples, one sidewall of the channel can be outward concave and curved and the opposite sidewall can be straight, aligned with a sidewall of the inlet microfluidic channel portion. In further examples, the straight sidewall can also be aligned with a sidewall of the outlet microfluidic channel portion. The curved sidewall can have a radius of curvature from 40 μm to 500 μm, or from 60 μm to 400 μm, or from 80 μm to 300 μm, or from 100 μm to 250 μm, or from 120 μm to 200 μm, in some examples.

The overpass and underpass microfluidic channels can also have a channel height. In some cases the channel height can be constant throughout the length and width of the channels. The overpass and underpass microfluidic channels can have the same channel height or different channel heights. If the microfluidic mixer is made from stacked layers of solid material, then the channel heights can be the thicknesses of the layers of solid material. In various examples, the overpass and underpass microfluidic channels can have a channel height from 8 μm to 50 μm, or from 10 μm to 30 μm, or from 11 μm to 20 μm, or from 12 μm to 17 μm.

The examples described above have referred to individual layers of solid material that have various microfluidic features formed therein, and the layers can be “stacked” to form the microfluidic mixers. In some examples, the layers can initially be formed as individual layers of solid material and portions of the layers can be removed to form microfluidic channel segments. The layers can then be stacked together and adhered together by curing, or by adhesive, or by fusing, or some other method. However, in other examples, the layers may not be formed as individual solid layers before being stacked together in this way. For example, a liquid photoresist material can be spread in a layer and then patterned and developed to form a solid layer having any desired microfluidic features formed therein. Another layer of liquid photoresist material can then be spread on the first layer, and the process of patterning and developing can be repeated to form additional layers. Thus, the layers can be formed one on top of another. In further examples, combinations of curable liquid material and solid material can be used. A variety of methods can be used to deposit layers of liquid photoresist material, such as spin coating, casting, spray coating, dip coating, and others.

In some examples, any of the layers of the microfluidic mixers can be formed from a photoresist such as SU-8 or SU-8 2000 photoresist, which are epoxy-based negative photoresists. Specifically, SU-8 and SU-8 200 are Bisphenol A Novolac epoxy-based photoresists that are available from various sources, including MicroChem Corp. These materials can be exposed to UV light to become crosslinked, while portions that are unexposed remain soluble in a solvent and can be washed away to leave voids.

In some examples, the microfluidic mixers can be formed on a substrate such as a silicon material. For example, the substrate can be formed of single crystalline silicon, polycrystalline silicon, gallium arsenide, glass, silica, ceramics or a semiconducting material. In a particular example, the substrate can have a thickness from about 500 μm to about 1200 μm.

In further examples, a primer layer can be deposited on the substrate before a first layer of solid material to form the microfluidic mixers described herein. In certain examples, the primer layer can be a layer of a photoresist material, such as SU-8, with a thickness from about 2 μm to about 100 μm.

The lower layer of solid material, middle layer of solid material, upper layer of solid material, and any other layers of solid material in the microfluidic mixers can be formed by exposing a layer of photoresist with a pattern to define the microfluidic channels, angled recombining surfaces, and other microfluidic features described above. The unexposed photoresist can then be washed away. In some examples, the layers can have a thickness from 2 μm to 100 μm. Thus, the microfluidic channel segments can have a height from 2 μm to 100 μm. In further examples, the microfluidic channel segments can have a height from 6 μm to 60 μm, or from 10 μm to 50 μm, or from 14 μm to 40 μm.

In certain examples, layers of the microfluidic mixers can be formed by laminating a dry film photoresist over the layer below and then exposing the dry film photoresist with a UV pattern defining any microfluidic features to be formed in that layer. In further examples, an additional ceiling or cap layer can be laminated over the top of the upper layer, forming a ceiling for the microfluidic mixer.

Microfluidic Mixing Systems

The present disclosure also describes microfluidic mixing systems. These systems can include multiple microfluidic mixers connected in series. As explained above, the microfluidic mixers can "fold" the fluid stream and reduce the diffusion distance between different components of the fluid stream. Using multiple mixers in series can multiply this effect and greatly reduce the time for the fluid stream to be thoroughly mixed through diffusion.

Figure 9:
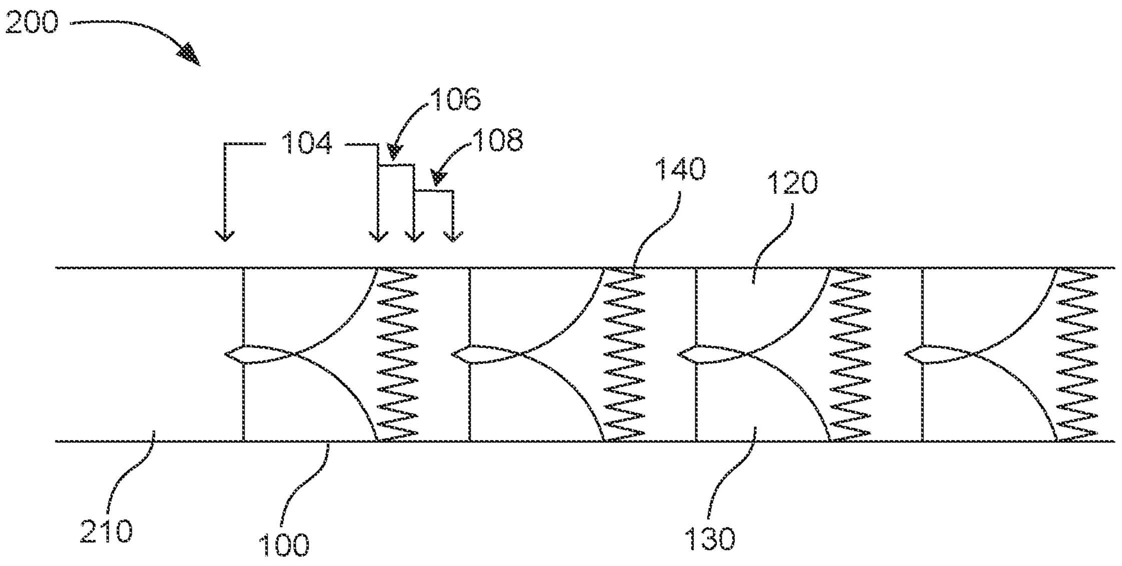
FIG. 9 is a schematic view of an example microfluidic mixing system in accordance with the present disclosure.

FIG. 9 shows a top plan view of an example microfluidic mixing system 200. This system includes a microfluidic channel 210 fluidly connected to a series of microfluidic mixers 100. The individual microfluidic mixers include a fluid splitting channel portion 104 including an overpass microfluidic channel 120 and an underpass microfluidic channel 130 that is fluidly separate from the overpass microfluidic channel. A fluid recombining channel portion 106 is downstream from the fluid splitting channel portion. The fluid recombining channel portion includes an angled recombining surface 140 having an acute angle with respect to a direction of fluid flow through the fluid recombining channel portion. As in the examples above, the angled recombining surface is positioned (in the z-axis direction) between the downstream end of the overpass microfluidic channel and the downstream end of the underpass microfluidic channel. An outlet microfluidic channel portion 108 is downstream from the fluid recombining channel portion. The outlet microfluidic channel portion of one microfluidic mixer is fluidly connected to the fluid splitting channel portion of the next microfluidic mixer downstream.

Microfluidic mixing systems can also include additional components. In some examples, the additional components can also be formed in layers of solid material by a two-dimensional patterning process, just as with the microfluidic mixers. In certain examples, a microfluidic mixing system can include a fluid reservoir for containing fluid that is to be mixed. If multiple different fluids are to be mixed, then the system can include multiple fluid reservoirs. These reservoirs can be connected to the microfluidic channel that is fluidly connected to a series of microfluidic mixers. The fluid reservoirs can be enclosed or open to allow fluids to be introduced into the reservoirs. The reservoirs can be connected to the microfluidic channel in a way such that the multiple fluids flow through the microfluidic channel together, and then the fluids can be mixed together by the series of microfluidic mixers. In some examples, the multiple fluids can initially be arranged in unmixed layers. These layers of fluid can be stacked vertically or horizontally. Regardless of the orientation of the different fluids in their unmixed state, the series of microfluidic mixers can fold the fluid stream multiple times, which will reduce the diffusion distance between the different fluids and allow the fluids to mix by diffusion quickly.

A variety of fluids can be mixed using the systems described herein. In some examples, the fluids can be different liquid chemical compounds. In further examples, the individual fluids can be mixtures that include multiple mixed compounds, and then the individual mixtures can be mixed together. In certain examples, a fluid can be an aqueous solution or dispersion. In other examples, the multiple fluids can be reagents that can react when mixed together.

The fluids that are mixed together in the microfluidic mixing system can undergo a chemical reaction after mixing. In some examples, the system can include a reaction chamber that provides space for the reaction to occur. The reaction chamber can be a simple empty chamber, or may include dry reagents, immobilized probe molecules, or other components to participate in a reaction. In certain examples, the reaction chamber can be designed to be self-priming by capillary action similar to the microfluidic mixers. The self-priming reaction chamber can incorporate similar design concepts, such as avoiding sudden increases in fluid cross-sectional area. The reaction chamber can also include support pillars, which can have a tapered downstream edge similar to the support pillars described above in the microfluidic mixers.

As explained above, the microfluidic mixers can be designed to be primed by capillary action, meaning that fluid will flow through the microfluidic mixers by capillary action without any external application of pressure. The microfluidic mixing systems described herein can also be designed to be primed by capillary action in the same way. However, once the system has been fully primed and the microfluidic channels and mixers are filled with liquid, no more flow will occur by capillary action. Some systems can be designed to perform a desired process to completion using capillary action alone, and the process can be complete when flow due to capillary action ceases. However, in some examples it may be useful to continue fluid flow through the mixers even after the system has been fully primed. In these cases, a pump can be used to continue to cause liquid to flow through the mixers. The microfluidic mixing system can include any suitable type of micropump to pump fluid through the microfluidic mixers. In one example, the micropump can be an inertial pump. The inertial pump can include a fluid actuator such as a thermal resistor or a piezoelectric element. The fluid actuator can be used to repeatedly displace a volume of fluid in a microfluidic channel. The fluid actuator can be positioned near an asymmetrical feature in the microfluidic channel that can increase resistance to fluid flow in one direction more than in another direction. This can cause a net flow of fluid in one direction. The fluid actuator can be placed near a one-way valve in some examples. In other examples, a droplet ejector can be included downstream of the microfluidic mixers. The droplet ejector can eject droplets of fluid out of the system or into a holding reservoir. Droplet ejectors can include, for example, a thermal inkjet resistor and nozzle for ejecting droplets of fluid through the nozzle. This can cause fluid flow to continue through the microfluidic mixers. In certain examples, the microfluidic mixing system can be incorporated in a printer to mix inks. For example, ingredients in an ink can be mixed before the ink is printed, or multiple colors can be mixed to make an ink of a desired color before the ink is printed.

Figure 10:
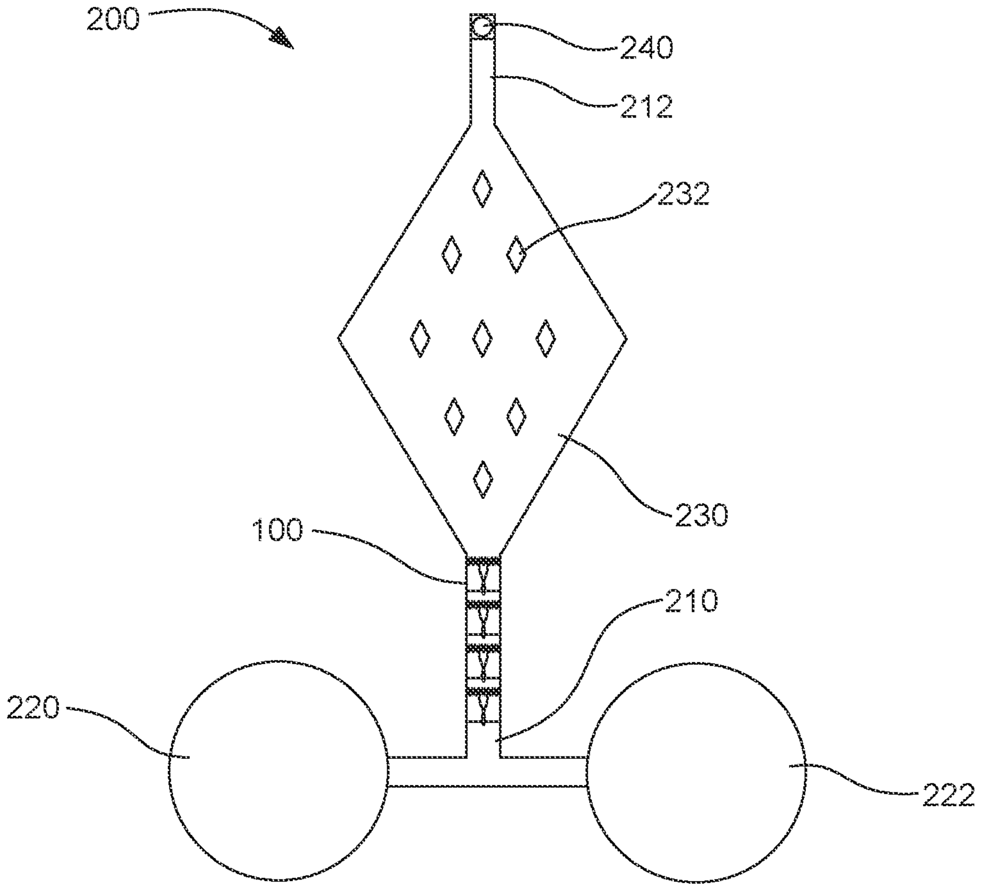
FIG. 10 is a schematic view of another example microfluidic mixing system in accordance with the present disclosure.

FIG. 10 is a schematic view of an example microfluidic mixing system 200 that includes several of the features described above. This system includes a microfluidic channel 210 fluidly connected to a series of microfluidic mixers 100. Two fluid reservoirs 220 and 222 are fluidly connected to the microfluidic channel to feed two different fluids into the channel. Downstream of the mixers, the system includes a self-priming reaction chamber 230 that has internal support pillars 232 to prevent the ceiling of the chamber from sagging. Downstream of the reaction chamber is a second microfluidic channel 212 leading to a droplet ejector 240. Fluid can flow by capillary action through the entire system until the fluid reaches the end of the second microfluidic channel. After this, the droplet ejector can eject fluid and draw additional fluid down the second microfluidic channel, which can cause flow to continue in the rest of the system.

Methods of Mixing Fluid

Figure 11:
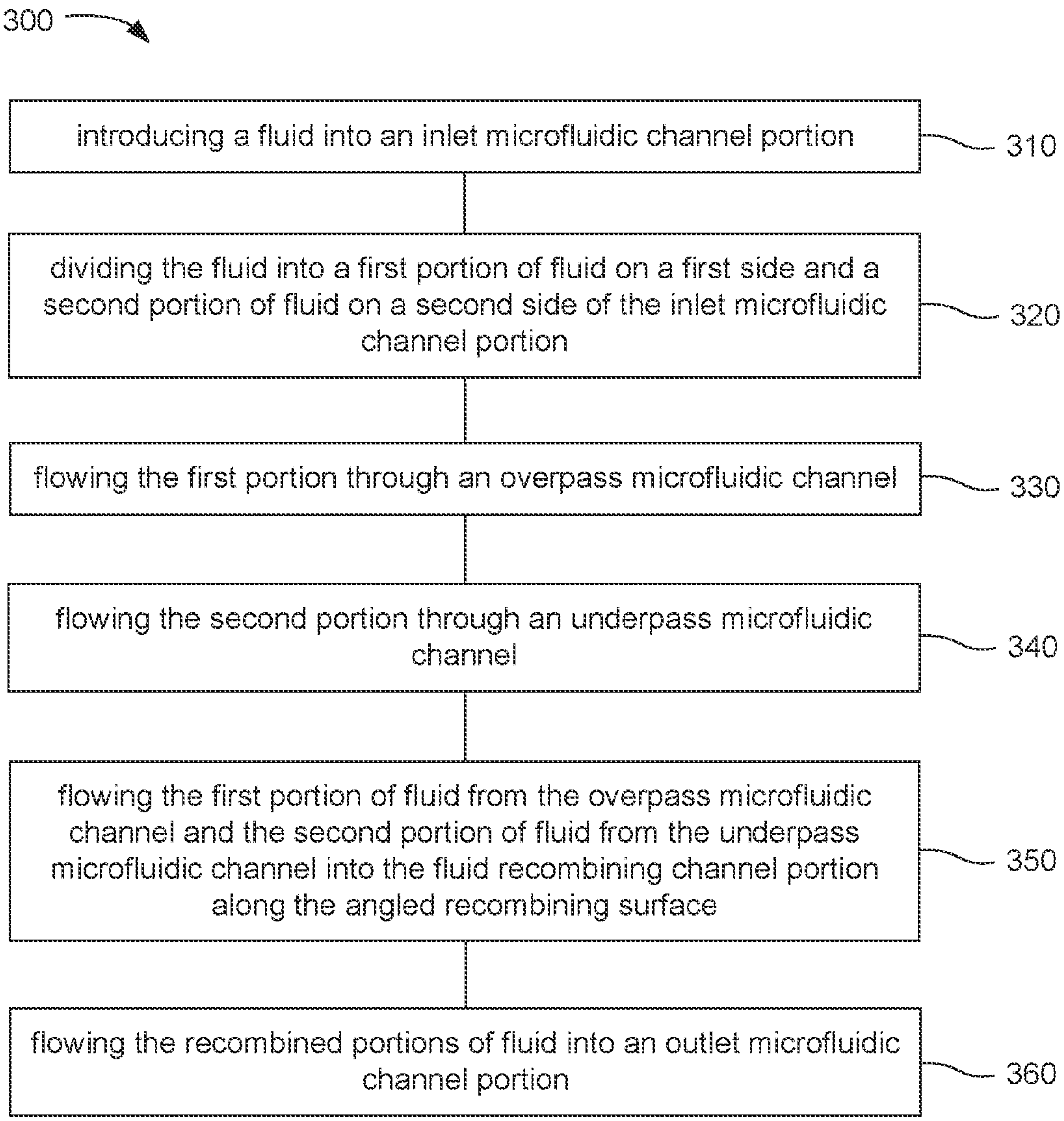
FIG. 11 is a flowchart illustrating an example method of mixing fluid in accordance with the present disclosure.

The present disclosure also describes methods of mixing fluid. These methods can utilize microfluidic mixers having any of the features of the microfluidic mixers described above. FIG. 11 is a flowchart illustrating an abbreviated example method 300 of mixing fluid, which is provided in greater detail below. This method includes introducing 310 a fluid into an inlet microfluidic channel portion of a microfluidic mixer and dividing 320 the fluid into a first portion of fluid on a first side of the inlet microfluidic channel portion and a second portion of fluid on a second side of the inlet microfluidic channel portion. The method also includes flowing 330, by capillary action, the first portion through an overpass microfluidic channel and flowing 340, by capillary action, the second portion through an underpass microfluidic channel. The underpass microfluidic channel extends under the overpass microfluidic channel such that a downstream end of the overpass microfluidic channel overlaps with a downstream end of the underpass microfluidic channel. In further detail, the method also includes flowing 350, by capillary action, the first portion of fluid from the overpass microfluidic channel into a fluid recombining channel portion along an angled recombining surface, and also flowing, by capillary action, the second portion of fluid from the underpass microfluidic channel into the fluid recombining channel portion along the angled recombining surface. This recombines the second portion of fluid with the first portion of fluid. The angled recombining surface has an acute angle with respect to a direction of fluid flow through the fluid recombining channel portion, and the angled recombining surface is between the downstream end of the overpass microfluidic channel and the downstream end of the underpass microfluidic channel. The method also includes flowing 360, by capillary action, the recombined first portion and second portion of fluid from the fluid recombining channel portion into an outlet microfluidic channel portion.

As mentioned above, the microfluidic mixers described herein can be particularly useful when used with a high-contact-angle fluid. In some examples, the fluid that is used to prime the microfluidic mixer can have a contact angle of 70° or greater than the material of the microfluidic mixer walls. Some example fluids that may have a high contact angle include pure water, reagents, biological components such as dispersions of live cells, surfactant-free dispersions, and others.

The methods of mixing a fluid can include passing the fluid through a single microfluidic mixer or through multiple microfluidic mixers. In some examples, the number of microfluidic mixers can be selected to provide a desired level of mixing. In various examples, the number of microfluidic mixers used can be from 4 to 20, or from 6 to 16, or from 8 to 12, or from 8 to 10.

The methods of mixing a fluid can also include flowing the fluid through the microfluidic mixer without additional pressure applied to the fluid besides capillary action. As explained above, this flow by capillary action can continue until the mixing system has been fully primed. In further examples, the methods can also include using a pump to continue to drive fluid flow through the mixer after the system has been fully primed.

It is to be understood that this disclosure is not limited to the particular processes and materials disclosed herein because such processes and materials may vary somewhat. It is also to be understood that the terminology used herein is used for the purpose of describing particular examples. The terms are not intended to be limiting because the scope of the present disclosure is intended to be limited by the appended claims and equivalents thereof.

It is noted that, as used in this specification and the appended claims, the singular forms "a," "an," and "the" include plural referents unless the context clearly dictates otherwise.

As used herein, the term "substantial" or "substantially" when used in reference to a quantity or amount of a material, or a specific characteristic thereof, refers to an amount that is sufficient to provide an effect that the material or characteristic was intended to provide. The exact degree of deviation allowable may in some cases depend on the specific context.

As used herein, the term "about" is used to provide flexibility to a numerical range endpoint by providing that a given value may be "a little above" or "a little below" the endpoint. The degree of flexibility of this term can be dictated by the particular variable and determined based on the associated description herein.

As used herein, a plurality of items, structural elements, compositional elements, and/or materials may be presented in a common list for convenience. However, these lists should be construed as though members of the list are individually identified as a separate and unique members. Thus, no individual member of such list should be construed as a de facto equivalent of any other member of the same list solely based on their presentation in a common group without indications to the contrary.

Concentrations, amounts, and other numerical data may be expressed or presented herein in a range format. It is to be understood that such a range format is used merely for convenience and brevity and thus should be interpreted flexibly to include the numerical values explicitly recited as the limits of the range, and also to include individual numerical values or sub-ranges encompassed within that range as if the numerical values and sub-ranges are explicitly recited. As an illustration, a numerical range of "about 1 wt % to about 5 wt %" should be interpreted to include the explicitly recited values of about 1 wt % to about 5 wt %, and also include individual values and sub-ranges within the indicated range. Thus, included in this numerical range are individual values such as 2, 3.5, and 4 and sub-ranges such as from 1-3, from 2-4, and from 3-5, etc. This same principle applies to ranges reciting a single numerical value. Furthermore, such an interpretation should apply regardless of the breadth of the range or the characteristics being described.

EXAMPLES

Example 1—Microfluidic Overpass With a Single Angled Exterior Wall Segment

A three-dimensional computer model was prepared of a microfluidic mixer having a similar design to FIG. 5. In this model, the total length from the beginning of the inlet microfluidic channel portion to the end of the outlet microfluidic channel portion was 178 μm; the height of the inlet and outlet microfluidic channel portions was 45 μm; and the width of the inlet and outlet microfluidic channel portions was 112 μm. The angled recombination surface had a saw tooth shape where the acute angle between adjacent faces was 20°. The fluid splitting channel portion includes a first angled end wall and a second angled end wall to reduce bubble trapping. These angled end walls were angled at 60°.

The three-dimensional model of the microfluidic mixer was used to run a simulation of a liquid having a contact angle of 80° flowing through the microfluidic mixer with no force applied to the liquid except for the forces of adhesion with the solid walls and the force of surface tension at the liquid/air interface. The simulation also modeled momentum of the liquid. The result of the simulation was that the liquid successfully primed the entire microfluidic mixer by capillary action.

Example 2—Microfluidic Mixer Model Showing Mixing Efficiency

A three-dimensional computer model was prepared of a simplified microfluidic mixer design that did not include an angled recombination surface, but which did include an overpass channel receiving fluid from a left side portion of the inlet channel and an underpass stream receiving fluid from a right side portion of the inlet channel. The overpass channel then stacked on top of the underpass channel as in the example mixer designs described above. A computer simulation was performed with this model to demonstrate the mixing efficiency when using multiple mixers in series. This simulation did not account for surface tension forces or capillary action, but instead assumed a steady flow of fluid through the mixer. The simulation modeled diffusion between two different fluids. The two fluids were fed into the inlet in two side-by-side unmixed layers. Mixing of the fluids occurred by diffusion, and the diffusion distance between the fluids decreased as the microfluidic mixers folded the fluid stream on itself multiple times. After passing through 8 microfluidic mixers in series, the two fluids were substantially fully mixed. The simulation also modeled pressure drop due to the microfluidic mixers. It was determined that the pressure drop increased linearly with the addition of more mixers, while the diffusion speed increased exponentially.

While the present technology has been described with reference to certain examples, various modifications, changes, omissions, and substitutions can be made without departing from the spirit of the disclosure. It is intended, therefore, that the disclosure be limited by the scope of the following claims.

What is claimed is:

1. A microfluidic mixer, comprising:

an inlet microfluidic channel portion;

a fluid splitting channel portion downstream from the inlet microfluidic channel portion, wherein the fluid splitting channel portion comprises:

an overpass microfluidic channel fluidly connected to the inlet microfluidic channel portion to receive fluid from a first side of the inlet microfluidic channel portion, and an underpass microfluidic channel fluidly connected to the inlet microfluidic channel portion to receive fluid from a second side of the inlet microfluidic channel portion, wherein the underpass microfluidic channel extends under the overpass microfluidic channel such that a downstream end of the overpass microfluidic channel overlaps with a downstream end of the underpass microfluidic channel;

a fluid recombining channel portion downstream from the fluid splitting channel portion, wherein the fluid recombining channel portion is fluidly connected to the overpass microfluidic channel and the underpass microfluidic channel, wherein the fluid recombining channel portion comprises an angled recombining surface having an acute angle with respect to a direction of fluid flow through the fluid recombining channel portion, and wherein the angled recombining surface is between the downstream end of the overpass microfluidic channel and the downstream end of the underpass microfluidic channel; and an outlet microfluidic channel portion fluidly connected to the fluid recombining channel portion to receive recombined fluid from the fluid recombining channel portion.

2. The microfluidic mixer of claim 1, further comprising a lower layer of photoresist material, a middle layer of photoresist material over the lower layer, and an upper layer of photoresist material over the middle layer; wherein the inlet microfluidic channel portion and the outlet microfluidic channel are both three-layer-high channels formed in the lower layer, middle layer, and upper layer; wherein the overpass microfluidic channel is a single-layer-high channel formed in the upper layer; wherein the underpass microfluidic channel is a single-layer-high channel formed in the lower layer; and wherein the overpass microfluidic channel is separated from the underpass microfluidic channel by solid photoresist material in the middle layer.

3. The microfluidic mixer of claim 1, wherein the angled recombining surface has a saw tooth shape including multiple angled faces, wherein an angle between adjacent angled faces is from 5° to 45°.

4. The microfluidic mixer of claim 1, wherein the overpass microfluidic channel comprises a first outwardly concave curved sidewall; wherein a fluid cross-sectional area of the overpass microfluidic channel increases in a fluid flow direction along the first outwardly concave curved sidewall; wherein the underpass microfluidic channel comprises a second outwardly concave curved sidewall curving in an opposite direction to the first outwardly concave curved sidewall; and wherein a fluid cross-sectional area of the underpass microfluidic channel increases in a fluid flow direction along the second outwardly concave curved sidewall.

5. The microfluidic mixer of claim 1, further comprising a fluid splitting element in the fluid splitting channel portion, extending upstream from an upstream end of the overpass microfluidic channel and an upstream end of the underpass microfluidic channel, wherein the fluid splitting element divides fluid from the first and second sides of the inlet microfluidic channel portion.

6. The microfluidic mixer of claim 5, wherein the fluid splitting channel portion further comprises a first angled end wall to direct fluid from the first side of the inlet microfluidic channel portion into the overpass microfluidic channel, wherein the first angled end wall is positioned below the upstream end of the overpass microfluidic channel, wherein the first angled end wall forms an acute angle with a sidewall of the fluid splitting channel portion; and wherein the fluid splitting channel portion further comprises a second angled end wall to direct fluid from the second side of the inlet microfluidic channel portion into the underpass microfluidic channel, wherein the second angled end wall is positioned above the upstream end of the underpass microfluidic channel, wherein the second angled end wall forms an acute angle with an opposite sidewall of the fluid splitting channel portion.

7. The microfluidic mixer of claim 1, further comprising a solid support pillar in the overpass microfluidic channel, or the underpass microfluidic channel, or both, wherein the solid support pillar has a tapered downstream edge having an acute angle such that a fluid cross-sectional area increases in the fluid flow direction along the tapered downstream edge.

8. The microfluidic mixer of claim 1, wherein the inlet microfluidic channel portion and the outlet microfluidic channel portion have a width from 20 μm to 300 μm and a height from 6 μm to 100 μm.

9. A method of mixing fluid, comprising:

introducing a fluid into an inlet microfluidic channel portion of a microfluidic mixer;

dividing the fluid into a first portion of fluid on a first side of the inlet microfluidic channel portion and a second portion of fluid on a second side of the inlet microfluidic channel portion;

flowing, by capillary action, the first portion through an overpass microfluidic channel;

flowing, by capillary action, the second portion through an underpass microfluidic channel, wherein the underpass microfluidic channel extends under the overpass microfluidic channel such that a downstream end of the overpass microfluidic channel overlaps with a downstream end of the underpass microfluidic channel;

flowing, by capillary action, the first portion of fluid from the overpass microfluidic channel into a fluid recombining channel portion along an angled recombining surface;

flowing, by capillary action, the second portion of fluid from the underpass microfluidic channel into the fluid recombining channel portion along the angled recombining surface, thereby recombining the second portion of fluid with the first portion of fluid, wherein the angled recombining surface has an acute angle with respect to a direction of fluid flow through the fluid recombining channel portion, and wherein the angled recombining surface is between the downstream end of the overpass microfluidic channel and the downstream end of the underpass microfluidic channel; and flowing, by capillary action, the recombined first portion and second portion of fluid from the fluid recombining channel portion into an outlet microfluidic channel portion.

10. The method of claim 9, further comprising flowing the fluid from the outlet microfluidic channel portion through a series of multiple additional microfluidic mixers, wherein a total number of microfluidic mixers is from 4 to 20.

11. The method of claim 9, wherein no additional pressure is applied to the fluid flowing through the microfluidic mixer besides the capillary action.

* * * * *